United States Patent
Finn et al.

(10) Patent No.: US 9,272,370 B2
(45) Date of Patent: Mar. 1, 2016

(54) LASER ABLATING STRUCTURES FOR ANTENNA MODULES FOR DUAL INTERFACE SMARTCARDS

(71) Applicants: David Finn, Tourmakeady County Mayo (IE); Mustafa Lotya, Celbridge. Co Kildare (IE)

(72) Inventors: David Finn, Tourmakeady County Mayo (IE); Mustafa Lotya, Celbridge. Co Kildare (IE)

(73) Assignee: Féinics AmaTech Teoranta, Lower Churchfield, Tourmakeady, Co. Mayo (IE)

( * ) Notice: Subject to any disclaimer, the term of this patent is extended or adjusted under 35 U.S.C. 154(b) by 0 days.

(21) Appl. No.: 14/281,876

(22) Filed: May 19, 2014

(65) Prior Publication Data
US 2014/0284386 A1   Sep. 25, 2014

Related U.S. Application Data

(63) Continuation-in-part of application No. 14/173,815, filed on Feb. 6, 2014, and a continuation-in-part of application No. 14/259,187, filed on Apr. 23, 2014, and a continuation-in-part of application No. 14/078,527, filed on Nov. 13, 2013, now Pat. No. 9,112,272, and a continuation-in-part of application No. 14/020,884, filed on Sep. 8, 2013, now Pat. No. 9,033,250, which is a continuation of application No. 13/931,828, filed on Jun. 29, 2013, now Pat. No. 8,708,240, and a continuation-in-part of application No. 13/756,631, filed on Feb. 1, 2013, now Pat. No.

(Continued)

(51) Int. Cl.
| | |
|---|---|
| *B23K 26/364* | (2014.01) |
| *B23K 26/36* | (2014.01) |
| *H01Q 1/22* | (2006.01) |
| *H01Q 7/00* | (2006.01) |
| *B23K 26/40* | (2014.01) |
| *H01Q 1/38* | (2006.01) |
| *H01Q 7/06* | (2006.01) |
| *G06K 19/077* | (2006.01) |

(52) U.S. Cl.
CPC .............. *B23K 26/365* (2013.01); *B23K 26/362* (2013.01); *B23K 26/40* (2013.01); *B23K 26/4075* (2013.01); *G06K 19/0775* (2013.01); *H01Q 1/2225* (2013.01); *H01Q 1/38* (2013.01); *H01Q 7/00* (2013.01); *H01Q 7/06* (2013.01); *B23K 2201/40* (2013.01); *B23K 2203/50* (2013.01); *G06K 19/07769* (2013.01); *G06K 19/07771* (2013.01); *G06K 19/07773* (2013.01)

(58) Field of Classification Search
CPC .............. B23K 26/365; B23K 26/4075; B23K 2201/40; H01Q 1/2225; H01Q 1/38; H01Q 7/06
See application file for complete search history.

(56) References Cited

U.S. PATENT DOCUMENTS

| | | |
|---|---|---|
| 6,190,942 B1 | 2/2001 | Wilm |
| 6,310,778 B1 | 10/2001 | Finn et al. |
| 6,568,600 B1 | 5/2003 | Carpier et al. |
| 6,634,564 B2 | 10/2003 | Kuramochi |
| 6,719,206 B1 | 4/2004 | Bashan et al. |
| 6,778,384 B2 | 8/2004 | Kashiwabara et al. |
| 6,794,727 B2 | 9/2004 | Leduc et al. |

(Continued)

FOREIGN PATENT DOCUMENTS

WO   WO 2008/081224   7/2008

*Primary Examiner* — Kristy A Haupt
(74) *Attorney, Agent, or Firm* — Gerald E. Linden

(57) ABSTRACT

Laser etching antenna structures (AS) for RFID antenna modules (AM). Combining laser etching and chemical etching. Limiting the thickness of the contact pads (CP) to less than the skin depth (18 m) of the conductive material (copper) used for the contact pads (CP). Multiple antenna structures (AS1, AS2) in an antenna module (AM). Incorporating LEDs into the antenna module (AM) or smartcard (SC).

18 Claims, 17 Drawing Sheets

Related U.S. Application Data 8,870,080, which is a continuation of application No. 13/205,600, filed on Aug. 8, 2011, now Pat. No. 8,474,726, application No. 14/281,876, which is a continuation-in-part of application No. 13/744,686, filed on Jan. 18, 2013, now abandoned, and a continuation-in-part of application No. 13/594,895, filed on Aug. 27, 2012, now Pat. No. 8,789,762, application No. 14/281,876, which is a continuation-in-part of application No. 14/061,864, filed on Oct. 24, 2013, now Pat. No. 9,027,227, which is a continuation of application No. 13/027,415, filed on Feb. 15, 2011, now Pat. No. 8,613,132, application No. 14/281,876, which is a continuation-in-part of application No. 13/730,811, filed on Dec. 28, 2012, now Pat. No. 9,165,240, which is a continuation-in-part of application No. 13/310,718, filed on Dec. 3, 2011, now Pat. No. 8,366,009, and a continuation-in-part of application No. 13/294,578, filed on Nov. 11, 2011, now abandoned, application No. 14/281,876, which is a continuation-in-part of application No. 13/600,140, filed on Aug. 30, 2012, now Pat. No. 8,991,712.

(60) Provisional application No. 61/971,636, filed on Mar. 28, 2014, provisional application No. 61/950,020, filed on Mar. 8, 2014, provisional application No. 61/945,689, filed on Feb. 27, 2014, provisional application No. 61/937,541, filed on Feb. 9, 2014, provisional application No. 61/920,737, filed on Dec. 25, 2013, provisional application No. 61/875,046, filed on Sep. 8, 2013, provisional application No. 61/868,089, filed on Aug. 21, 2013, provisional application No. 61/860,354, filed on Jul. 31, 2013, provisional application No. 61/841,286, filed on Jun. 29, 2013, provisional application No. 61/827,754, filed on May 28, 2013, provisional application No. 61/914,996, filed on Dec. 12, 2013, provisional application No. 61/905,134, filed on Nov. 15, 2013, provisional application No. 61/384,219, filed on Sep. 17, 2010, provisional application No. 61/373,269, filed on Aug. 12, 2010, provisional application No. 61/493,611, filed on Jun. 6, 2011, provisional application No. 61/493,448, filed on Jun. 4, 2011, provisional application No. 61/569,317, filed on Dec. 12, 2011, provisional application No. 61/586,781, filed on Jan. 14, 2012, provisional application No. 61/589,434, filed on Jan. 23, 2012, provisional application No. 61/595,088, filed on Feb. 5, 2012, provisional application No. 61/619,951, filed on Apr. 4, 2012, provisional application No. 61/624,384, filed on Apr. 15, 2012, provisional application No. 61/624,412, filed on Apr. 16, 2012, provisional application No. 61/646,369, filed on May 14, 2012, provisional application No. 61/660,668, filed on Jun. 15, 2012, provisional application No. 61/666,962, filed on Jul. 2, 2012, provisional application No. 61/693,262, filed on Aug. 25, 2012, provisional application No. 61/521,741, filed on Aug. 9, 2011, provisional application No. 61/533,228, filed on Sep. 11, 2011, provisional application No. 61/536,153, filed on Sep. 19, 2011.

(56) References Cited

U.S. PATENT DOCUMENTS

| | | | |
|---|---|---|---|
| 8,033,457 | B2 | 10/2011 | Varga et al. |
| 8,100,337 | B2 | 1/2012 | Artigue et al. |
| 8,544,756 | B2 | 10/2013 | Bosquet et al. |
| 2008/0129496 | A1* | 6/2008 | Koblasz .................. 340/540 |
| 2008/0245879 | A1 | 10/2008 | Artigue et al. |
| 2010/0134291 | A1* | 6/2010 | Lavedas ................ 340/572.7 |
| 2011/0031655 | A1* | 2/2011 | Toth et al. .................. 264/400 |
| 2012/0138691 | A1 | 6/2012 | Bosquet et al. |
| 2013/0062419 | A1 | 3/2013 | Finn et al. |
| 2013/0075477 | A1 | 3/2013 | Finn et al. |
| 2013/0134227 | A1 | 5/2013 | De Maquille et al. |
| 2013/0146670 | A1 | 6/2013 | Grieshofer et al. |
| 2013/0146671 | A1 | 6/2013 | Grieshofer et al. |
| 2014/0091149 | A1 | 4/2014 | Finn et al. |

* cited by examiner

Dual Interface (DI) Smart Card, and Readers an exemplary booster antenna (BA)

two module antenna segments (MA1, MA2)

two antenna segments (OS, IS) connected as quasi-dipole etched antenna on separate layer antenna substrate AS joined to module substrate MT two antenna coils (MA1,MA2),
on two layers of module tape (MT1,MT2)

MA with one coil

MA with two coils connection bridges contact pad layout (6 pad)

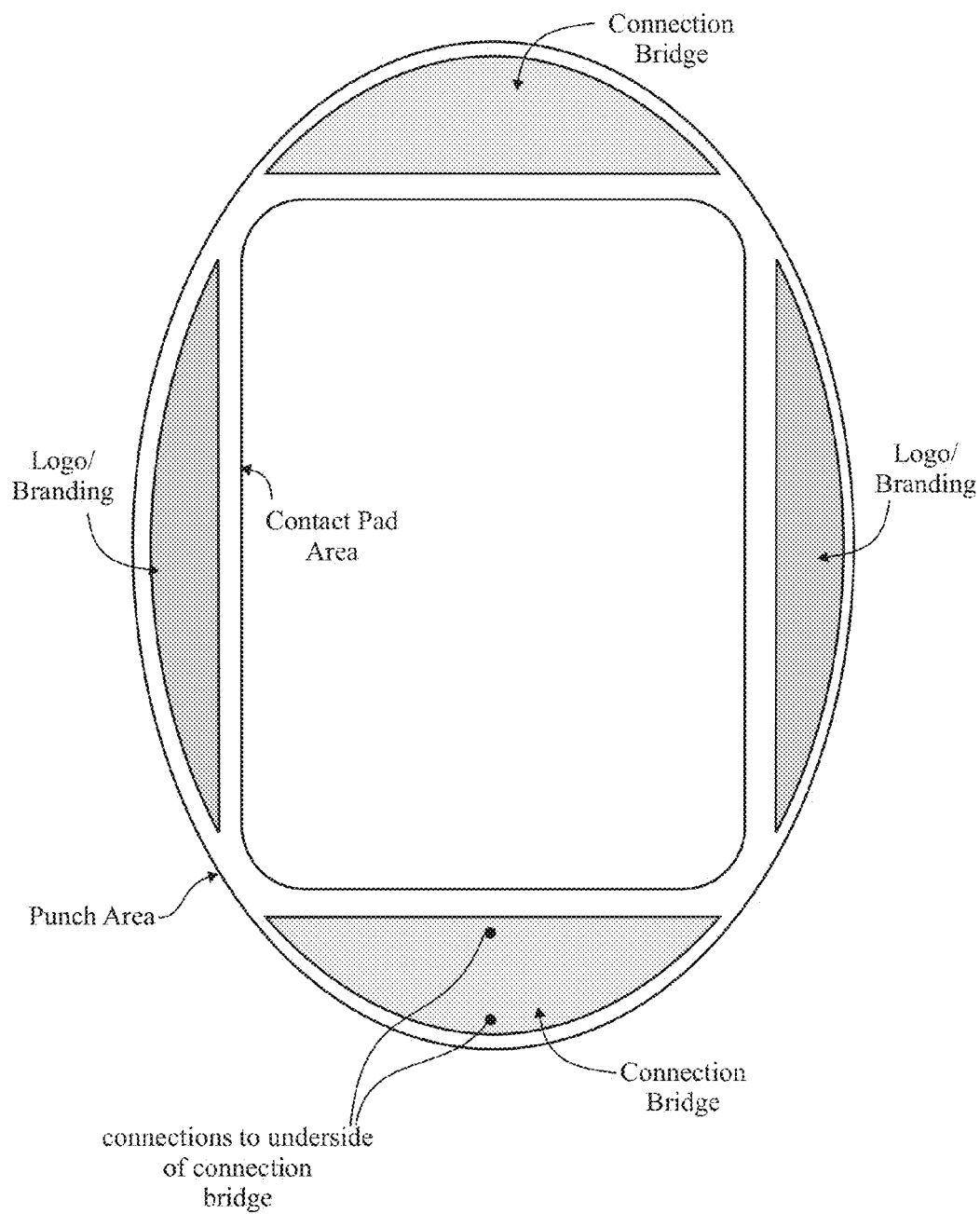

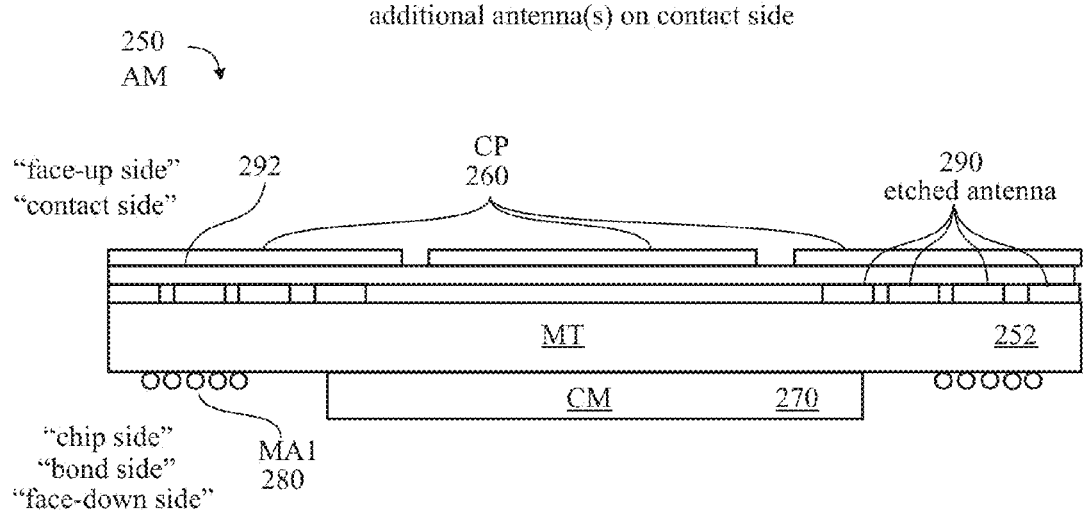

single-sided tape, laser-etched copper cladding, contact pad layer less than skin depth single-sided tape, antenna structure produced off line and subsequently joined to the module tape MT laser-etched antenna structure AS joined to module tape MT Two antennas (AS1, AS2) on face-down side laser etched antenna structure AS mounted to module tape MT pre-peg with foil on one side
(single-sided tape)

ablate for antenna structure leaving "bridges"

joining foil to tape etch to complete traces chemical etch tracks of antenna structure AS revealed
contact pads CP formed

LASER ABLATING STRUCTURES FOR ANTENNA MODULES FOR DUAL INTERFACE SMARTCARDS

CROSS-REFERENCE(S) TO RELATED APPLICATIONS

Priority is claimed from the following, all of which are incorporated by reference herein:

This is a non-provisional of U.S. 61/971,636 filed 28 Mar. 2014

This is a non-provisional of U.S. 61/950,020 filed 8 Mar. 2014

This is a non-provisional of U.S. 61/945,689 filed 27 Feb. 2014

This is a non-provisional of U.S. 61/937,541 filed 9 Feb. 2014

This is a non-provisional of U.S. 61/920,737 filed 25 Dec. 2013

This is a non-provisional of U.S. 61/875,046 filed 8 Sep. 2013

This is a non-provisional of U.S. 61/868,089 filed 21 Aug. 2013

This is a non-provisional of U.S. 61/860,354 filed 31 Jul. 2013

This is a non-provisional of U.S. 61/841,286 filed 29 Jun. 2013

This is a non-provisional of U.S. 61/827,754 filed 28 May 2013

This is a continuation-in-part of U.S. Ser. No. 14/173,815 filed 6 Feb. 2014 which claims priority from
    U.S. 61/914,996 filed 12 Dec. 2013
    U.S. 61/905,134 filed 15 Nov. 2013

This is a continuation-in-part of U.S. Ser. No. 14/078,527 filed 13 Nov. 2013

This is a continuation-in-part of U.S. Ser. No. 14/020,884 filed 8 Sep. 2013 (US20140091149; 3 Apr. 2014)

This is a continuation-in-part of U.S. Ser. No. 13/756,631 filed 1 Feb. 2013 (US 20130140370, 6 Jun. 2013)

This is a continuation-in-part of Ser. No. 14/259,187 filed 23 Apr. 2014, which is a continuation of U.S. Ser. No. 13/931,828 filed 29 Jun. 2013 (U.S. Pat. No. 8,708,240, 29 Apr. 2014), which is a continuation of U.S. Ser. No. 13/205,600 filed 8 Aug. 2011 U.S. Pat. No. 8,474,726, 12 Jul. 2013), which claims priority from
    U.S. 61/384,219 filed 17 Sep. 2010
    U.S. 61/373,269 filed 12 Aug. 2010
    U.S. 61/493,611 filed 6 Jun. 2011
    U.S. 61/493,448 filed 4 Jun. 2011

This is a continuation-in-part of U.S. Ser. No. 13/744,686 filed 18 Jan. 2013 (published US 20130126622, 22 May 2013), which claims priority from
    U.S. 61/693,262 filed 25 Aug. 2012
    U.S. 61/619,951 filed 4 Apr. 2012
    U.S. 61/589,434 filed 22 Jan. 2012

This is a continuation-in-part of U.S. Ser. No. 13/594,895 filed 27 Aug. 2012 (US 2013/0062419, 14 Mar. 2013, which claims priority from
    61/569,317 filed Dec. 12, 2011
    61/586,781 filed Jan. 14, 2012
    61/589,434 filed Jan. 23, 2012
    61/595,088 filed Feb. 5, 2012
    61/619,951 filed Apr. 4, 2012
    61/624,384 filed Apr. 15, 2012
    61/624,412 filed Apr. 16, 2012
    61/646,369 filed May 14, 2012
    61/660,668 filed Jun. 15, 2012
    61/666,962 filed Jul. 2, 2012
    61/693,262 filed Aug. 25, 2012

This is a continuation-in-part of U.S. Ser. No. 14/061,864 filed 24 Oct. 2013 (20140059841 6 Mar. 2014) which is a continuation of U.S. Ser. No. 13/027,415 filed 15 Feb. 2011 (US 20120080527, 5 Apr. 2012; U.S. Pat. No. 8,613,132 24 Dec. 2013).

This is a continuation-in-part of U.S. Ser. No. 13/730,811 filed 28 Dec. 2012 (20140024732 16 Jan. 2014), which is a continuation-in-part of U.S. Ser. No. 13/310,718 filed 3 Dec. 2011 (published US 20120074233, 29 Mar. 2012; issued U.S. Pat. No. 8,366,009 5 Feb. 2013) which claims priority from
    U.S. 61/521,741 filed 9 Aug. 2011
    U.S. 61/533,228 filed 11 Sep. 2011
    U.S. 61/536,153 filed 19 Sep. 2011
    U.S. Ser. No. 13/294,578 filed 11 Nov. 2011

This is a continuation-in-part of U.S. Ser. No. 13/600,140 filed 30 Aug. 2012 (US 20130075477; 28 Mar. 2013)

TECHNICAL FIELD

This disclosure relates to smartcards (or smart cards) and the like, operating at least in a contactless mode (ISO 14443). The smartcard (SC) may comprise an inlay substrate or card body (CB), an antenna module (AM), and a booster antenna (BA). The antenna module (AM) may comprise an RFID (radio frequency identification) chip or IC (integrated circuit) (CM) and a module antenna (MA). The RFID chip (CM) may be mounted on a face-down side of a module tape (MT). The module tape (MT) may have an array of contact pads (CP), on a face-up side thereof, for interfacing with an external contact reader (ISO 7816-2). The module antenna (MA) may comprise one or more antenna structures (AS), for interfacing with an external contactless reader (ISO 14443). The module antenna (MA) may be wire-wound or etched. This disclosure relates more particularly to laser-etched antenna structures (AS), and also to configurations of antenna modules (AM) having one or more antenna structures (AS).

BACKGROUND

Dual interface (DI or DIF) smartcards (more generally, secure documents) may comprise an antenna module (AM) with a number of (typically 6 or 8) contact pads (CP) connected with an RFID chip (CM) via wire bonds or flip chip assembly, and a booster antenna (BA) in the card body (CB) consisting of a card body antenna (CA), an extension antenna (EA) and coupling coil (CC) which inductively couples with the module antenna (MA) of the antenna module (AM). The RFID chip may be referred to as a "chip IC".

The booster antenna (BA) may comprise various antenna components, such as a card body antenna (CA) for coupling with an external contactless reader, an extension antenna, and a coupling coil (CC) for coupling with the module antenna (MA) of the antenna module (AM).

The antenna module AM may generally comprise a "DI" RFID chip (bare, unpackaged silicon die) or chip module (a die with leadframe, carrier, redistribution substrate, interposer or the like)—either of which may be referred to as "CM"—mounted to a module tape "MT". A module antenna "MA" may be disposed on the module tape MT for implementing a contactless interface. An array of contact pads "CP" may be disposed on the module tape MT for implementing the contact interface.

The overall dimensions of the antenna module (AM) may be approximately 11.8 mm×13 mm (8 contact pad) or 10.6 mm×8.0 mm (6 contact pad). The overall dimensions of the card body (CB) may be approximately 54 mm×86 mm. The overall dimensions and pattern of the contact pads (CP) may be specified by ISO 7816. The contact pads (CP) occupy a "contact pad area" on the face-up side of the antenna module (AM), and may have a thickness of approximately 30 µm (30 microns) as standard.

The module tape MT may comprise epoxy-glass FR4 or ANSI grade G10 or equivalent, and may have two sides (or surfaces)—a "face-up" or contact side, and a "face-down" or bond side (or chip side). The module tape MT may be one-sided, having conductive foil on only one side thereof (such as the face-up side). The module tape MT may be two-sided, having conductive foil on both sides thereof. The conductive foil may comprise copper, and may be plated with nickel and gold.

The contact pads CP may be formed, such as by etching, from the conducive foil on the face-up side of the module tape MT, and may be disposed in an array of (typically) 6 or 8 pads on the face-up side of the module tape MT.

The RFID chip may be disposed on the bond side (or chip side, or face-down side) of the module tape MT.

The module antenna MA may be wire-wound, having several turns of wire, and may be disposed on the face-down side of the module tape MT. The module antenna MA may be etched from conductive foil on the face-down side of the module tape MT.

The module tape MT may comprise conductive traces and connection pads (or bond pads) on the face-down side of the module tape MT, both of which may be etched from the conductive foil on the face-down side of the module tape MT. The RFID chip (CM or IC) may be connected by wire bonding to some of the connection pads. Alternatively, the RFID chip may be flip-chip mounted to some of the bond pads. A wire-wound module antenna may be connected by wire bonding to some of the connection pads.

Plated through holes (which may be referred to as "vias") may be provided through the module tape MT for connecting the RFID chip CM to selected ones of the contact pads CP on the face-up side of the module tape MT. Blind holes may be provided through the module tape MT for wire-bonding to the underside(s) of selected ones of the contact pads CP on the face-up side of the module tape MT.

Connection bridges may be disposed on the face-up side of the module tape MT for effecting interconnections between the module antenna MA and RFID chip CM of the face-down side of the antenna module AM, via through hole connections (or vias) extending through the module tape MT from the face-down side thereof to the face-up side thereof.

Some Prior Art Patent References

The following patents and publications may be relevant to some embodiments of the invention(s) disclosed herein.

| document number | date (yyyy-mm-dd) | Inventor (Assignee) |
| --- | --- | --- |
| 8,100,337 | 2012-Jan.-24 | Artigue et al. (SPS) |
| 8,544,756 | 2013-Oct.-1 | Bosquet at al. (Oberthur) |
| 8,033,457 | 2011-20-Nov. | Varga et al. (American Express) |
| 6,310,778 | 2001-Oct.-30 | Finn et al. |
| 6,568,600 | 2003-May-27 | Carpier et al. (Bull CP8) |
| 6,634,564 | 2003-Oct.-21 | Kuramochi (Dia Nippon Printing) |
| 6,719,206 | 2004-Apr.-13 | Bashan et al. (OTI) |
| 6,794,727 | 2004-Sept-21 | Leduc et al. (Gemplus) |
| 6,778,384 | 2004-Aug.-17 | Kashiwabara et al. (Alps) |
| 20130146671 | 2013-Jun.-13 | Grieshofer et al. (Infineon) |
| 20130146670 | 2013-Jun.-13 | Grieshofer et al. (Infineon) |
| 20130134227 | 2013-May-30 | De Maquille et al. (Linxens) |
| 20120138691 | 2012-Jun.-7 | Bosquet at al. (Oberthur) |
| EP 2,541,471 | 2013-Jan.-2 | Merlin et al. (Gemalto) |

SUMMARY

It is a general object of the invention to provide techniques for improving the operation of RFID devices (smartcards, tags and the like) having antenna modules AM and operating at least in a contactless mode (ISO 14443).

Some specific objects may include (but are not limited to):
 providing techniques for accommodating one or more antenna structures AS in an antenna module AM; and
 providing techniques for laser ablating antenna structures AS having tracks with minimal separation distance determined by the width, pulse shape, and power of the laser beam.

Some of the techniques disclosed herein may be applicable to dual interface (or dual-interface, contact and contactless interfaces) or single interface (contactless only) smartcards (or other RFID devices), including smartcards with metallization ("metal" smartcards). Some of the techniques disclosed herein may be applicable to small form factor transponder devices.

According to the invention, generally, antenna structures (AS) for RFID antenna modules (AM) may be formed by laser etching. Chemical etching may be performed in addition to the laser etching. The thickness of the contact pads (CP) may be limited to less than 18 µm (skin depth of copper at frequency of interest). Multiple antenna structures (AS1, AS2) may be incorporated into an antenna module (AM). LEDs may be incorporated into the antenna module (AM) or a smartcard (SC).

According to some embodiments (examples) of the invention, a dual-interface RFID antenna module (AM) may comprise: a module tape (MT); and a conductive layer (CL) on a face-up side of the module tape (MT); wherein at least a portion of the conductive layer (CL) has a thickness less than the skin depth of a material of the conductive layer (CL) at a given frequency. The conductive layer may comprise copper; the given frequency may be 13.56 MHz; and the skin depth may be approximately 17.7 µm. The antenna module (AM) may further comprise an RFID chip; and a module antenna (MA) connected to the RFID chip (CM); wherein improved communication performance may be achieved between the module antenna (MA) and an external contactless RFID reader as a result of the less than skin depth thickness of the material of the conductive layer (CL). The conductive layer may be patterned to comprise an array of contact pads (CP); he contact pads (CP) comprise first portions having a thickness greater than the skin depth and second portions having a thickness less than the skin depth.

According to some embodiments (examples) of the invention, a dual-interface RFID antenna module (AM) may comprise: a module tape (MT); and laser-etched conductive foil layer (CFL) attached to the module tape (MT). The conductive foil may be patterned to have tracks separated by spaces and may comprise an antenna structure (AS) for the antenna module (AM). The conductive foil may be laser etched only partially through its thickness; and a remaining, unetched thickness of the conductive foil may support at least some of the adjacent tracks of the antenna structure (AS). The remaining, unetched thickness of the conductive foil may comprise either of (i) an entire surface supporting the tracks or (ii) bridges connecting tracks.

According to some embodiments (examples) of the invention, a method of forming an antenna structure (AS) for an RFID antenna module (AM), may comprise: performing a first etch to etch at least partially through a conductive foil to exhibit tracks separated by spaces, the spaces being the etched portions of the foil, the tracks being the un-etched portions of the foil; and mounting the foil to a module tape (MT); wherein the first etch comprises laser ablation. The first etch may extend at least 70% and no more than 95% through the foil. A second etch may be performed to complete forming the tracks. The second etch may comprise chemical etching.

According to some embodiments (examples) of the invention, a method of forming an antenna structure (AS) for an RFID antenna module (AM) may comprise: laser etching a copper layer (CL) to form a laser-ablated structure; and chemical etching the laser-ablated structure. The copper layer may have an initial thickness; the laser etching may define a plurality of tracks, separated by spaces, the spaces extending at least partially through the copper cladding; and the chemical etching may removes less than one-tenth of the initial thickness of the copper layer, slightly increasing the size of the spaces between the tracks. The laser etching may define a plurality of tracks, separated by spaces; the chemical etching may decrease the thickness of the copper layer and increases the size of the spaces between the tracks; and the chemically-etched laser-ablated structure may be electroplated, to increase the thickness of the copper layer and to reduce the size of the spaces between tracks. The tracks may form at least a portion of an antenna structure (AS) for the RFID antenna module. The laser etching may proceed without significantly reducing the overall initial thickness of the copper layer.

According to some embodiments (examples) of the invention, an RFID antenna module (AM, 300, 400) may comprise: a module tape (MT); at least one cladding layer (CL) on the module tape; and at least one foil layer (FL); wherein: one of the foil layer or cladding layers is patterned to have contact pads (CP); and at least one other of the foil layer or cladding layer is laser etched to have an antenna structure (AS). The contact pads may have a thickness which is less than the skin depth of the material comprising the contact pads. The module tape (MT) may be double-sided, having cladding layers on both its face-up and face-down sides. The RFID antenna module (AM) may comprise at least two antenna structures (AS1, AS2). The foil layer may be disposed on the face-up side of the module tape (MT) and may be patterned to have contact pads (CP). The cladding layer may disposed on the face-down side of the module tape (MT) and may be patterned to have at least one antenna structure. There may be two antenna structures (IW, OW) on the face-down side of the antenna module (AM); and the two antenna structures may be connected with one another by a jumper on the face-up side of the module tape (MT).

According to some embodiments (examples) of the invention, an RFID antenna module (AM) may comprise: a module tape (MT) having a top surface and a bottom surface; a cladding layer (CL) disposed on the bottom surface of the module tape, patterned to form at least two antenna structures (AS1/IW, AS2/OW), each antenna structure having two ends; and vias extending through the module tape (MT), for electrically connecting selected ends of the two antenna structures with one another. A foil layer (FL) may be disposed on the top surface of the module tape, for forming contact pads (CP); wherein the contact pads (CP) have a thickness which is less than approximately 18 µm. An RFID chip may be mounted in the antenna module (AM) and connected with the antenna structures.

According to some embodiments (examples) of the invention, an RFID antenna module (AM) may comprise an LED which is connected to a wire wound, laser etched or chemically etched antenna. The antenna may be one of (i) a module antenna (MA), (ii) a booster antenna (BA) or (iii) an antenna that is independent of the module antenna (MA) or booster antenna (BA).

For smartcards and documents requiring high reliability, such as e-passports or national IDs, the coupler coil (CC) of a booster antenna (BA) could surround a transponder module (chip on a coil substrate) in which no contact operation is required (purely contactless operation). To keep the transponder module flat the chip could be connected to the substrate using flip-chip technology. The booster antenna may be chemically or laser etched.

The reader antenna may be modified to have antenna components similar to those of a booster antenna, namely a perimeter (card body) antenna (CA) component, an extension antenna (EA) component and a coupler coil component. The position of the antenna components may differ to that of a booster antenna; for example, the coupler coil (CC) could be in the center of the card antenna (CA). Alternatively, this antenna could be a separate antenna to that of the reader antenna. In this case the antenna on a suitable substrate may be attached or placed over the reader antenna in, for example, a payment terminal.

A silicon capacitor may be incorporated into the antenna module AM, operating in conjunction with the module antenna MA.

Magnetic particles may be incorporated into the antenna module AM.

An LED may be connected to the wire ends of a booster antenna BA in the card body (inlay substrate) to visually indicate a contactless transaction. Alternatively, the LED may be incorporated into the antenna module AM.

Other embodiments (examples) may be disclosed, and may be claimed. Both methods and apparatus may be disclosed, and may be claimed. Some interim products may be disclosed, and may be claimed.

The invention(s) described herein may relate to industrial and commercial industries, such as RFID devices and applications, smartcards, electronic passports and the like. Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGS). The figures may generally be in the form of diagrams. Some elements in the figures may be exaggerated or drawn not-to-scale, others may be omitted, for illustrative clarity. Some figures may be in the form of diagrams.

When terms such as "left" and "right", "top" and "bottom", "upper" and "lower", "inner" and "outer", or similar terms are used in the description, they may be used to guide the reader to orientations of elements in the figures, but should be understood not to limit the apparatus being described to any particular configuration or orientation, unless otherwise specified or evident from context.

Figure 1:
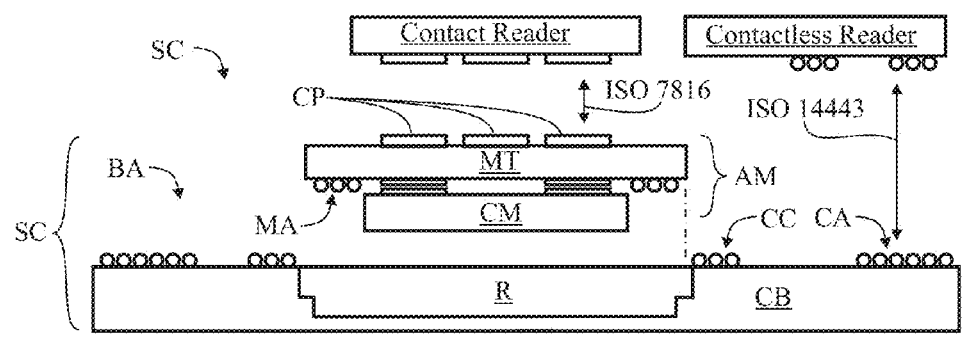

Different "versions" or iterations of elements may be referenced by reference numerals having the same numbers (###) followed by a different letter suffix (such as "A", "B", "C", or the like), in which case the similar elements may be inclusively referred to by the numeric portion (###) only of the reference numeral. Similar elements in different drawings may be referred to by similar numbers, differing in their most significant (typically hundreds) digit. Some elements may be referred to with letters (e.g., "BA", "CA", "CC", "EA" and the like), rather than (or in addition to) numerals (e.g., "12").

Any text (legends, notes, reference numerals and the like) appearing on the drawings are incorporated by reference herein.

Although the invention may be illustrated in the context of various exemplary embodiments, it should be understood that it is not intended to limit the invention to these particular embodiments, and individual features of various embodiments may be combined with one another.

FIG. 1 is a diagram, in cross-section, of a dual-interface smartcard and readers.

Figure 1A:
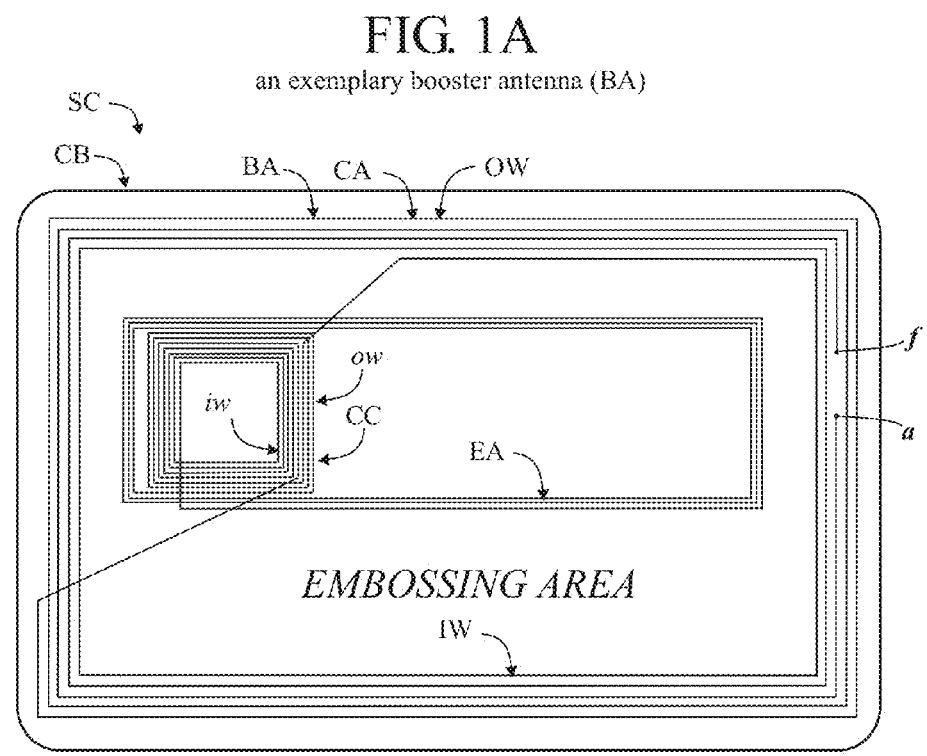

FIG. 1A is a diagram showing a configuration for a booster antenna (BA) of an smartcard having a card antenna (CA) component, a coupler coil antenna (CC) component and an extension antenna (EA) component.

Figure 2A:
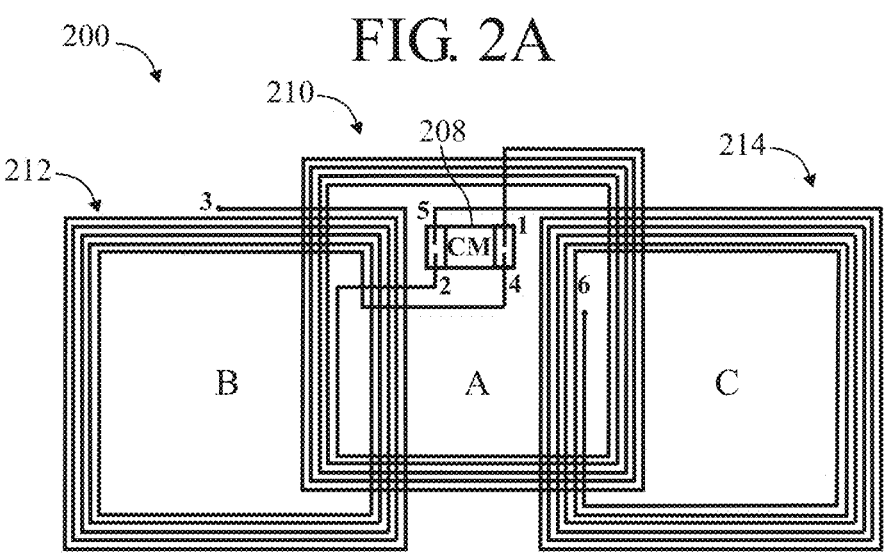
Figure 2B:
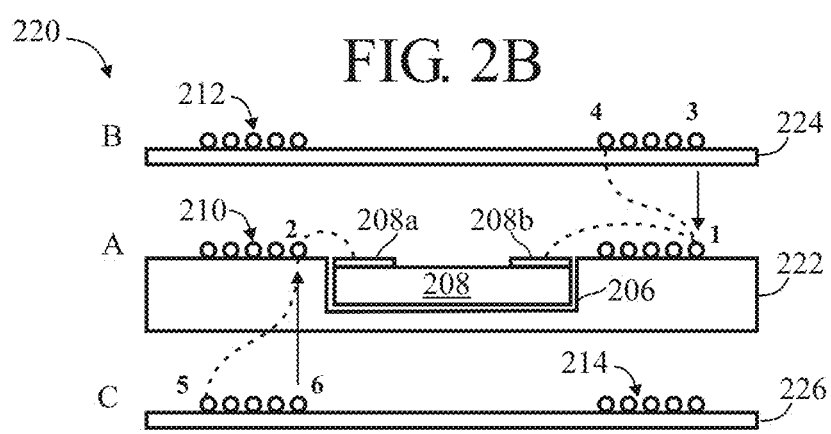

FIG. 2A is a schematic diagram and FIG. 2B is a cross-sectional view of an antenna module.

Figure 2C:
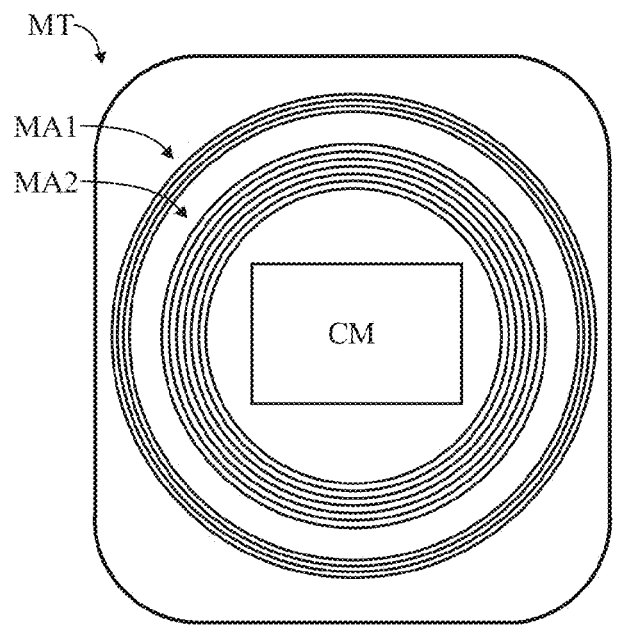

FIG. 2C is a diagram showing a module tape (MT) having two antenna structures, or module antenna segments (MA1, MA2).

Figure 2D:
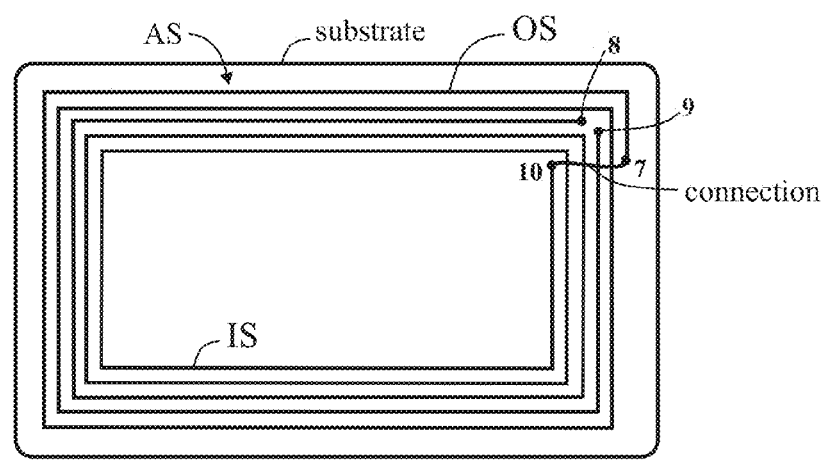

FIG. 2D is a diagram showing one possible way how the two antenna segments MA1, MA2 of FIG. 2C may be connected with one another.

Figure 2E:
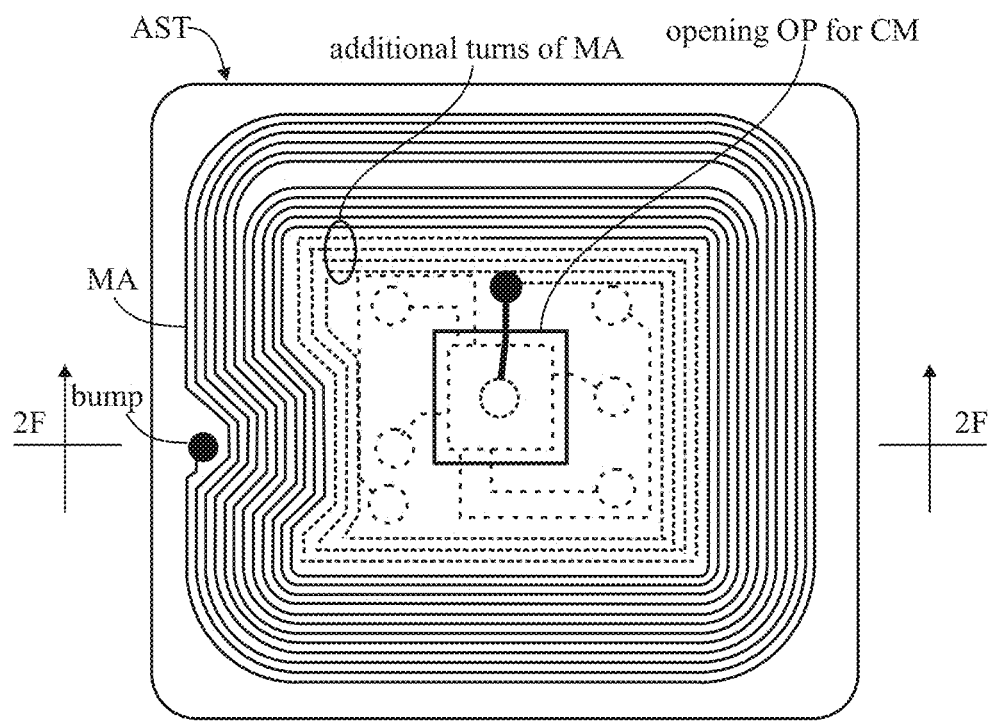
Figure 2F:
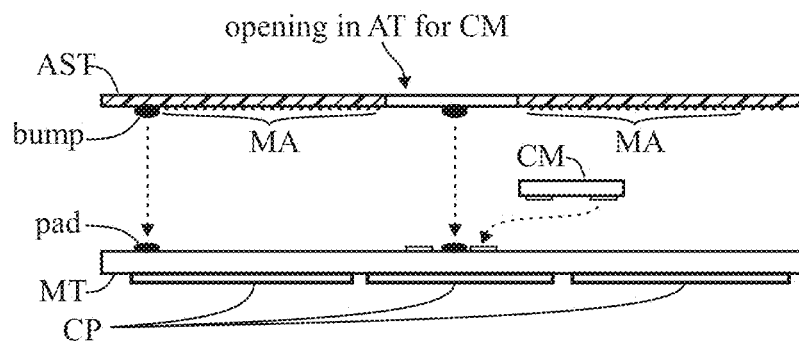

FIG. 2E is a plan view of an antenna substrate, and FIG. 2F is a cross-sectional view taken on a line 2F-2F through FIG. 2E.

Figure 2G:
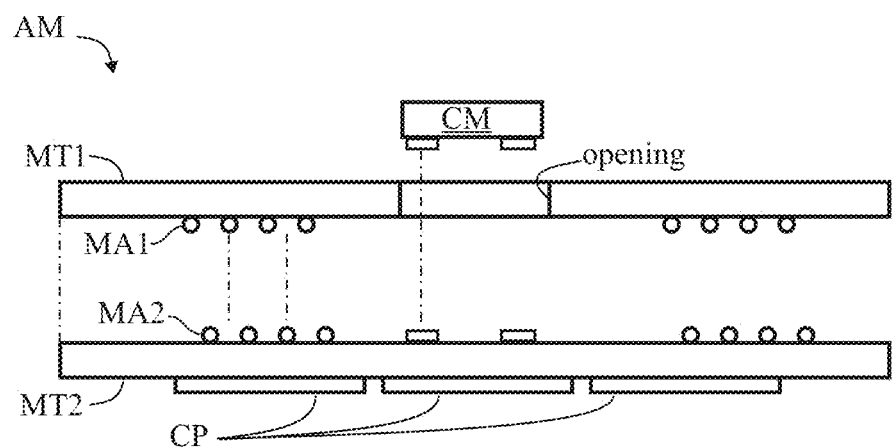

FIG. 2G is a cross-sectional view of an antenna module having a module antenna comprising two layers, each having an antenna coil.

Figure 2H:
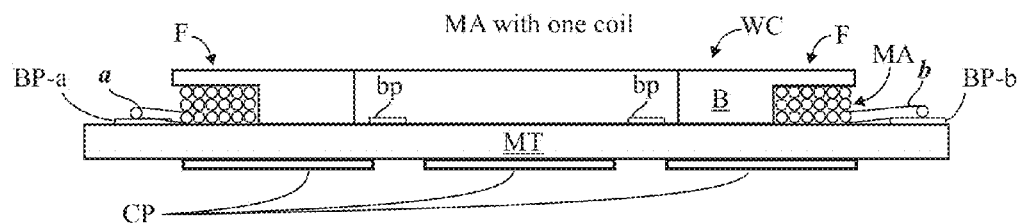

FIG. 2H is a diagram in cross-section showing a module antenna (MA) having one coil.

Figure 2I:
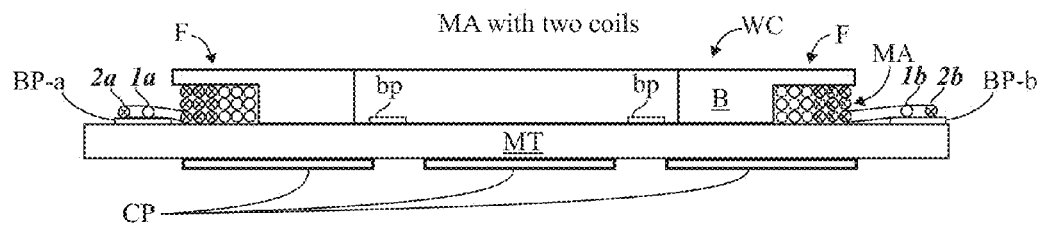

FIG. 2I is a diagram in cross-section showing a module antenna (MA) having two coils.

Figure 2J:
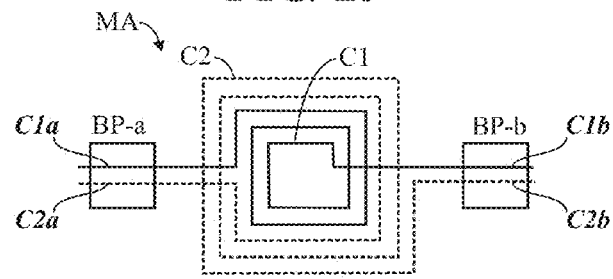

FIG. 2J is a diagram showing connecting the two coils of the module antenna (MA).

Figure 2K:
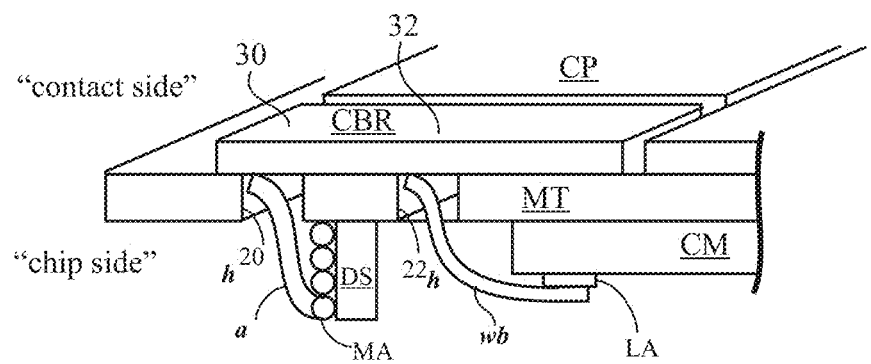

FIG. 2K is a cross-sectional view of a module tape (MT) having a connection bridge (CBR) for making connections from a components on a chip side of a module tape to components on a contact side of the tape.

Figure 2L:
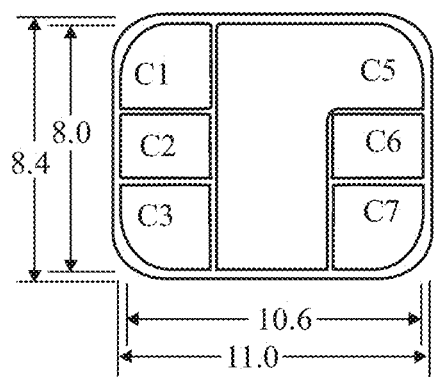

FIG. 2L is a diagram showing contact pads for a 6-pad contact pad array.

FIG. 2M is a diagram showing a contact pad area of an antenna module (AM) situated in an elliptical punched out area ("punching area") of a module tape (MT) and areas of conductive foil located outside of (external to) the contact pads (CP) and patterned as connection bridges (CBR), or for logo/branding.

FIG. 2N is diagram showing an antenna module with wire wound antenna on the "chip side" and an etched antenna on the "contact side" of a module tape (MT), under the contact pads (CP).

Figure 3A:
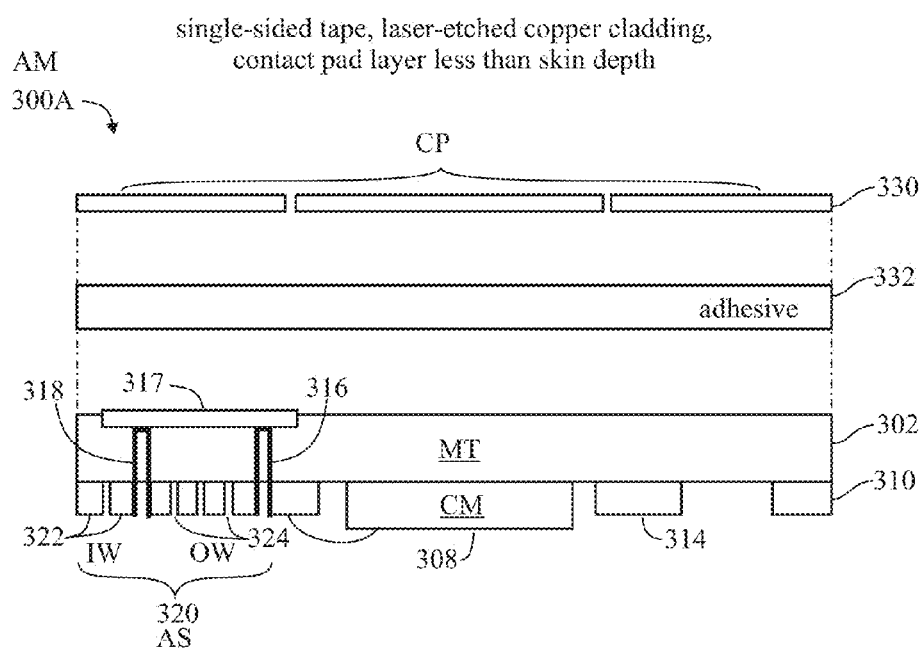

FIG. 3A is a diagram (exploded cross-sectional view) illustrating a construction of an antenna module AM based on a single-sided module tape MT which may comprise a glass-epoxy tape substrate having copper cladding on a face-down side thereof, and a copper foil laminated to the a face-up side thereof, such as for producing an antenna module AM having a module antenna MA comprising two antenna structures (or an inner and outer winding of a single antenna structure) on the face-down side thereof.

Figure 3B:
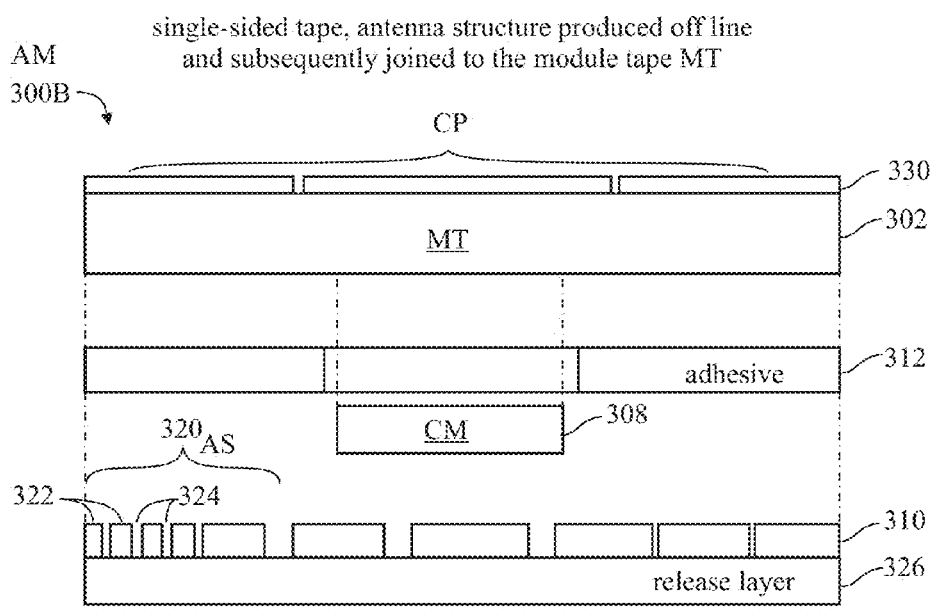

FIG. 3B is a diagram (exploded cross-sectional view) illustrating a construction of an antenna module AM based on a single-sided module tape MT which may comprise a glass-epoxy tape substrate having copper cladding on a face-up side thereof, and a copper foil laminated to the face-down side thereof, such as for producing an antenna module AM having a laser-etched antenna structure AS which may be produced "off line" and later mounted to the face-down side of the module tape MT.

Figure 3C:
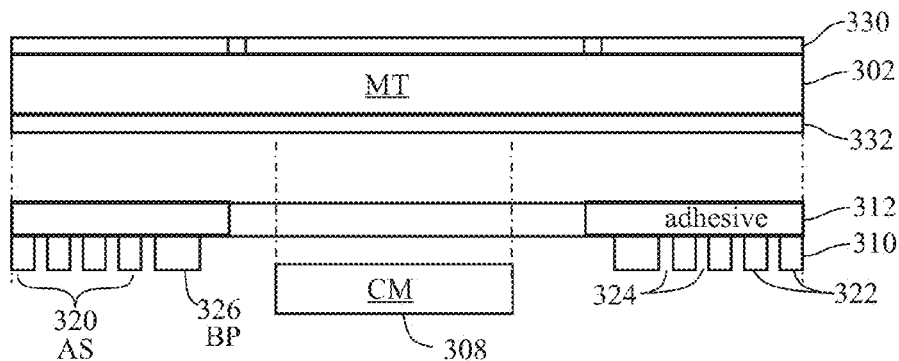

FIG. 3C is a diagram (exploded cross-sectional view) illustrating a construction of an antenna module AM based on a double-sided module tape MT which may comprise a glass-epoxy tape substrate having copper cladding on both the face-up and face down sides thereof, and a copper foil laminated to the a face-down side thereof, such as for producing an antenna module AM having a laser-etched antenna structure AS which may be produced "off line" and later mounted to the face-down side of the module tape MT.

Figure 3D:
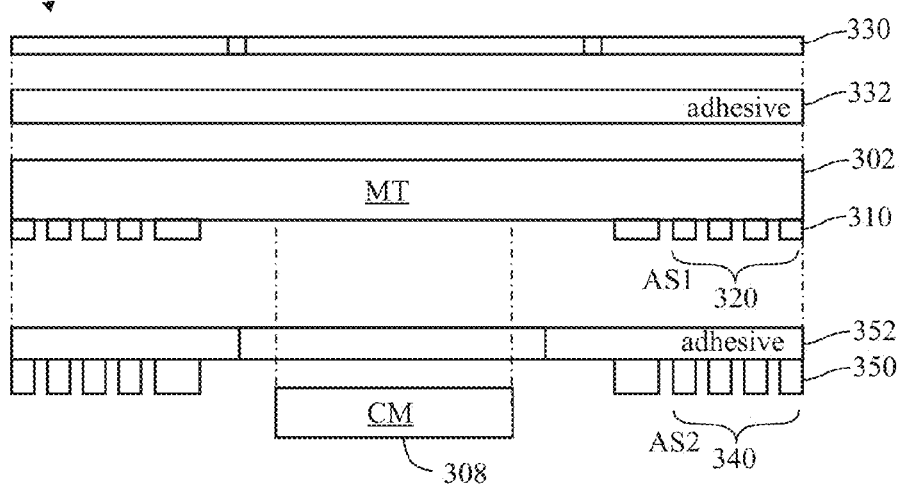

FIG. 3D is a diagram (exploded cross-sectional view) illustrating a construction of an antenna module AM based on a single-sided module tape MT which may comprise a glass-epoxy tape substrate having copper cladding on a face-down side thereof, and a copper foil laminated to the a face-up side thereof, with an additional layer of copper foil laminated to the face-down side thereof, such as for producing an antenna module AM having two module antenna structures (AS1, AS2) on the face-down side thereof.

Figure 3E:
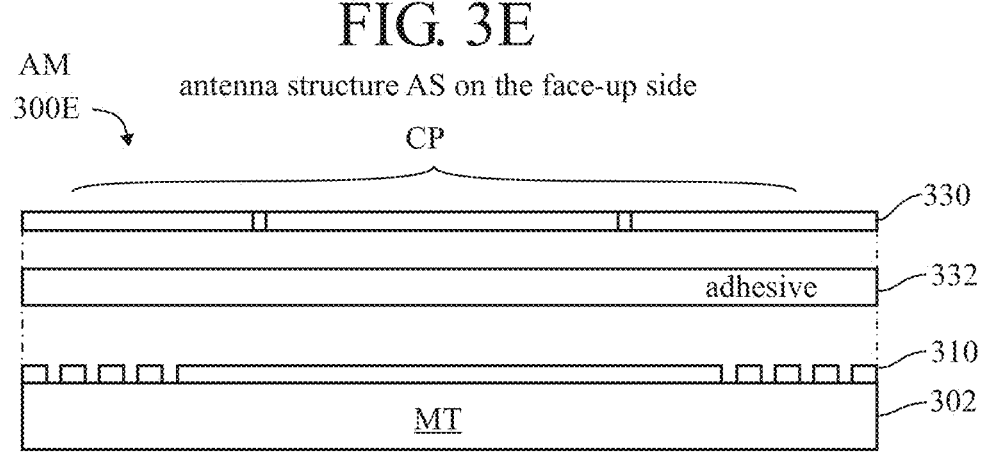

FIG. 3E is a diagram (exploded cross-sectional view) illustrating a construction of an antenna module AM based on a single-sided module tape MT which may comprise a glass-epoxy tape substrate having copper cladding on a face-up side thereof for forming an antenna structure (AS), and also having a copper foil laminated to the face-up side thereof for forming contact pads (CP), such as for producing an antenna module AM having an antenna structure AS disposed on the face-up side of the module tape MT, beneath the contact pads CP of the antenna module AM.

Figure 3F:
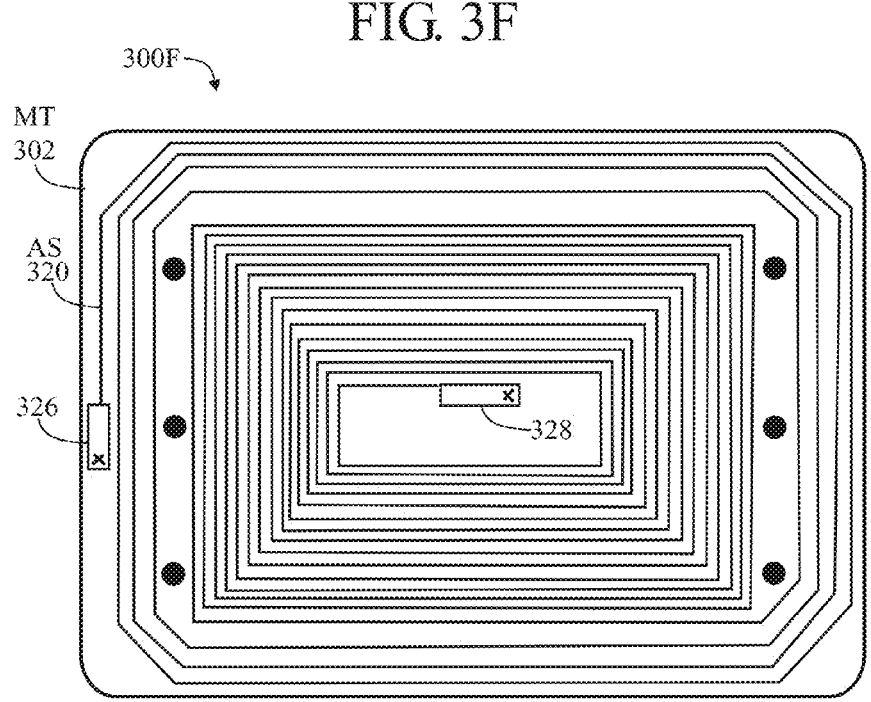
Figure 3G:
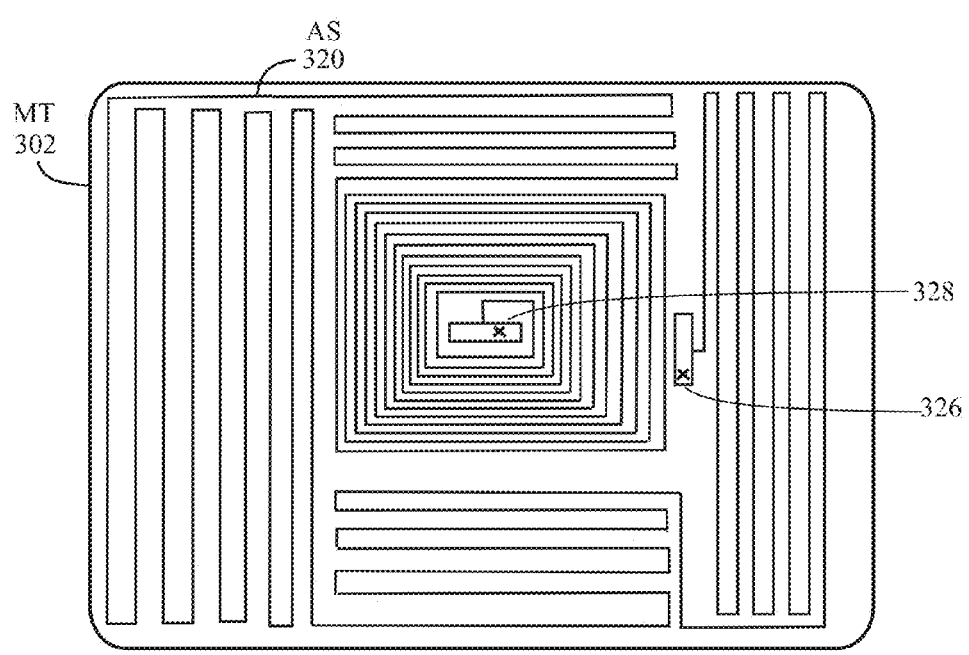

FIGS. 3F and 3G are diagrams (plan views) illustrating some configurations for an antenna structure AS disposed on the face-up side of the module tape MT, beneath the contact pads CP of the antenna module AM, such as has been discussed with respect to FIG. 3E.

Figure 4:
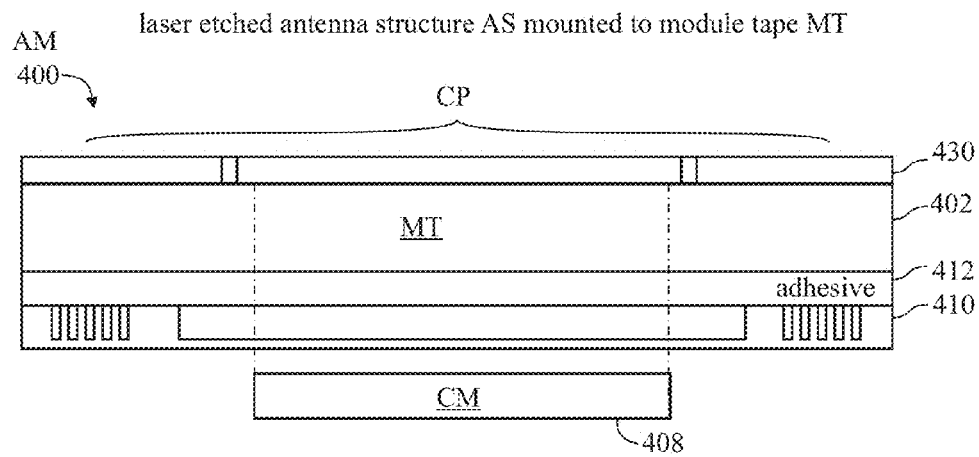

FIG. 4 is a diagram (cross-sectional view) illustrating a construction of an antenna module AM based on a laser etched module antenna MA (optionally including connection pads, and interconnect traces) which that has been partially etched in a conductive foil and which may be laminated to the face-down side of a single-sided module tape MT.

FIGS. 4A, 4B, 4D, 4E, 4F are diagrams (cross-sectional views) illustrating a technique for preparing and using an "inchoate" antenna structure (AS), such as may have been shown in FIG. 4. FIG. 4C is a diagram (plan view) of a portion of an antenna structure (AS).

Figure 5:
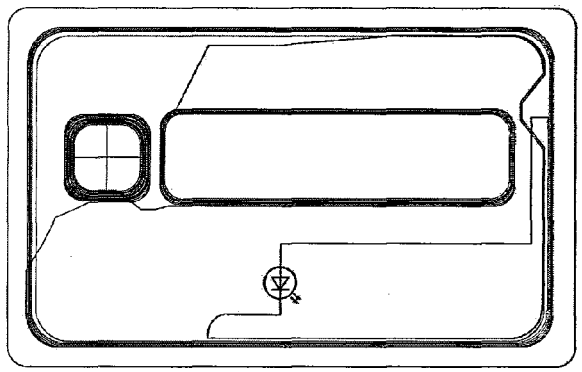

FIG. 5 is a diagram illustrating a booster antenna with its wire ends connected to an LED or any illuminating device without any physical connection to the chip module.

Figure 5A:
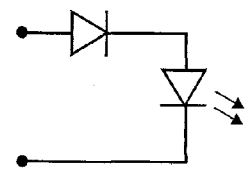

FIG. 5A is a diagram illustrating an LED connected in series with a rectifier diode.

Figure 5B:
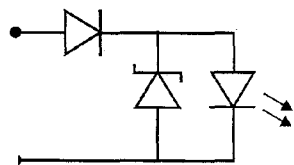

FIG. 5B is a diagram illustrating an LED connected in series with a rectifier diode and in parallel with a zener diode.

Figure 5C:
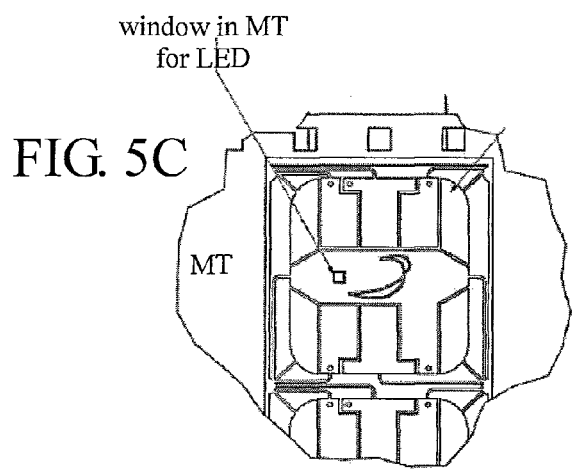

FIG. 5C is a diagram illustrating an LED in an antenna module (AM).

Figure 5D:
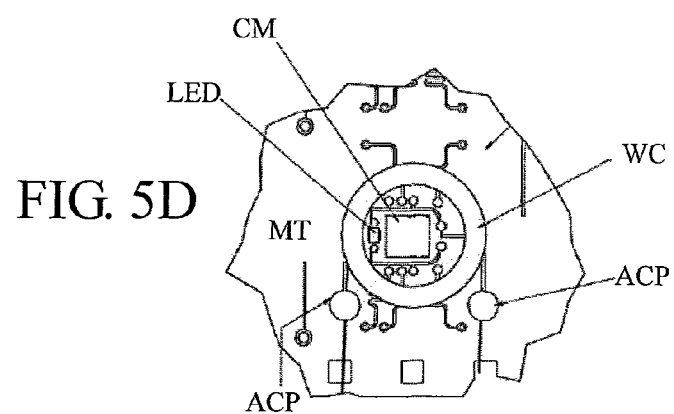

FIG. 5D is a diagram illustrating an LED in an antenna module (AM).

The drawings are exemplary of the various embodiments of the invention. To avoid cluttering the drawings, some features such as plated through holes, conductive traces for interconnects, bond pads, and other features may be omitted from the drawings. Passivation metallization layers may also be omitted for clarity.

DETAILED DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity.

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

Smartcards, Generally

A smartcard (as an example of a RFID device, such as secure document, a smartcard, an RFID tag, or a transponder device) may comprise an inlay substrate or card body (CB), an antenna module (AM), and a booster antenna (BA). The antenna module (AM) (or "antenna chip module", or sometimes "chip module") may comprise an RFID (radio frequency identification) chip or chip module (either of which may be referred to as "CM" or "IC") and a module antenna (MA). The RFID chip (CM, or IC) may be mounted on the "face down" or "chip side" or "bonding side" of a module tape. In the case of "dual interface" (DI) cards, the "face up" or "contact side" of the antenna module (AM) may have a number such as 6 or 8 contact pads (CP) for interfacing with a contact reader in a contact mode (ISO 7816-2). The booster antenna (BA), typically comprising several windings of wire in the card body (CB) may comprise various "antenna components", such as a card body antenna (CA) component for coupling with an external contactless reader (ISO 14443) a coupling coil (CC) component for coupling with the module antenna (MA) of the antenna module (AM) and an extension antenna (EA) component for enhancing performance of the booster antenna (BA).

RFID cards, electronic tags and secure documents in the form of pure contactless cards, dual interface cards, phone tags, key fobs, electronic passports, national identity cards and electronic driver licenses may be discussed as exemplary of various features and embodiments of the invention(s) disclosed herein. As will be evident, many features and embodiments may be applicable to (readily incorporated in) other forms of smartcards, such as EMV payment cards, metal composite cards, metal hybrid cards, metal foil cards, access control cards, small form factor cards and secure credential documents. As used herein, any one of the terms "transponder", "tag", "smartcard", "data carrier" and the like, may be interpreted to refer to any other of the devices similar thereto which operate under ISO 14443 or similar RFID standard. The following standards are incorporated in their entirety by reference herein:

ISO/IEC 14443 (Identification cards—Contactless integrated circuit cards—Proximity cards) is an international standard that defines proximity cards used for identification, and the transmission protocols for communicating with it.

ISO/IEC 7816 is an international standard related to electronic identification cards with contacts, especially smartcards.

EMV standards define the interaction at the physical, electrical, data and application levels between IC cards and IC card processing devices for financial transactions. There are standards based on ISO/IEC 7816 for contact cards, and standards based on ISO/IEC 14443 for contactless cards.

The module antennas (MA) described herein may comprise one or more antenna structures (AS). A given antenna structure AS may comprise a coil of wire, conductive tracks (or traces) etched or printed on a module tape (MT), or may, in some cases, be incorporated directly on the RFID chip itself. A layer of magnetic particles may be incorporated into the antenna module (AM) to improve the communication performance between the module antenna (MA) of the antenna module (AM) and a booster antenna (BA) of an inlay substrate or an antenna of an external contactless reader. The layer or core of magnetic particles may act as a filter (suppressor).

The descriptions that follow are mostly in the context of dual interface (DI, DIF) smartcards, and relate mostly to the contactless operation thereof. Many of the teachings set forth herein may be applicable to electronic passports or national identity cards and the like having only a contactless mode of operation (single interface). Generally, any dimensions set forth herein are approximate, and any materials set forth herein are intended to be exemplary, not limiting. For example, copper may often be recited as an example of an electrically conductive material which may be used as a foil layer or a cladding layer (such as on the module tape MT).

Antenna Modules (AM), Generally

The antenna module (AM) may be quite small (having a punching size of 10.8 mm×8.2 mm for a 6 contact pad module from NXP or 11.0 mm×8.3 mm for a 6 contact pad module from Infineon, or 13.0 mm×11.8 mm for a 8 contact pad module from Infineon).

Reference is made to ISO 7816, incorporated by reference herein, and defines the dimensions of a card body CB within which the antenna module AM may be mounted. The dimensions of the card body CB, as defined by ISO 7816 are:

Width: 85.47 mm-85.72 mm
Height: 53.92 mm-54.03 mm
Thickness: 0.76 mm+0.08 mm

The module antenna (MA) of the antenna module (AM) is inductively coupled rather than electrically connected to a booster antenna (BA) which is typically disposed in the card body (CB). The booster antenna (BA) may comprise a card antenna (CA) portion (or component) disposed around the periphery of the card body (CB) and a coupler coil (CC) portion (or component) disposed at an interior area of the card body (CB) for inductively coupling with the module antenna (MA). The booster antenna (BA) may further comprise an extension antenna (EA) portion (component) to provide enhanced capacitance and resistance, and improve coupling. The terms card antenna (CA) and booster antenna (BA) may be used interchangeably herein.

The module antenna MA may be a wire-wound coil, or an etched spiral pattern of conductive tracks (or traces), separated by spaces. For an etched pattern, the RFID chip CM is typically disposed in the center of the spiral antenna pattern, making that space (under the RFID chip CM) unavailable for turns of the antenna. A significant amount of space around the chip CM is unavailable for the etched antenna. The antenna module AM may have 8 or 6 contact pads. Some dimensions (all approximate) for the module may be,

- The overall size of an 8-pad module may be W=13.0 mm×H=11.8 mm
- The overall size of a 6-pad module may be W=11.0 mm×H=8.4 mm
- The module antenna MA may have 12 "turns", or tracks.
- Each track of the module antenna MA may have a width of 0.1 mm
- A gap between adjacent tracks of the module antenna may be 0.075 mm
- The "pitch" (width+gap) of the tracks may be 0.175 mm (0.1+0.075)
- The RFID chip CM may measure approximately 2 mm×2 mm
- The inner dimension of the module antenna MA may be approximately 9 mm×8 mm. This is the area occupied by the RFID chip CM and its interconnections.

Because of the restrictions on the size of the smartcard module (e.g. approximately 13×12 mm, or 11×9 mm), the number of turns (or tracks) forming the module antenna MA is normally limited to the space surrounding the central position of the RFID chip (silicon die) which is attached and bonded to the module tape MT. This module tape MT is typically made of epoxy glass with a contact metallization layer on the face-up side and a bonding metallization layer on the face-down side of the module. The chemically etched antenna is usually formed on the face-down side.

Some Materials and Processes

The primary metal used in the antenna module tapes as described herein may be copper, but other metals such as aluminium or an alloy could be used. The electrical conductivity can be different, and the skin depth may vary accordingly. Also, other metals or alloys may be mechanically more robust and/or easier to laser ablate, particularly in the case of laser ablation of free-standing foils.

Techniques to attach a partially-completed (or "inchoate") antenna structure formed in a metal layer of electro-deposited copper foil or any suitable metal layer including an alloy, to an epoxy glass tape (FR4) or polyimide film are described. Such attachment of the metal layer to the tape may be achieved through an adhesive-free process such as lamination. The antenna structure may be formed through laser etching, partially or fully ablating the metal. The metal foil may have a carrier supporting layer to facilitate the attachment to the tape. The metal layer may be treated to prevent oxidation having a passivation layer of chromium (10-15 nm) on both sides. The metal layer may have nodular roughness layer of zinc to improve the adhesion with the tape. The metal layer may have a thickness of approximately 9 μm, 12 μm, 18 μm or 35 μm, for example.

In some embodiments of the invention, an epoxy glass tape such as FR4, or a polyimide film may be laminated with a copper foil on one side, the other side then being coated with adhesive or thermoplastic material (e.g. a thermoplastic polyimide coating on a polyimide film). (Other materials may be used for the module tape MT.) The epoxy glass (FR4) or polyimide tape may be punched with sprocket holes and holes to accommodate vertical interconnects. A laser etched partially-completed (or "inchoate") antenna structure formed in a metal layer of electro-deposited copper foil or any suitable metal layer including an alloy can then be attached or laminated to the epoxy glass (FR4) or polyimide film as described previously. Subsequent wet chemical processes can then be used to process the tape and expose (complete the forming of) the laser etched tracks.

An Exemplary Smartcard (SC)

FIG. 1 illustrates a dual interface (DI) smartcard SC, along with a contact reader and a contactless reader. The smartcard may comprise a card body CB substrate which may have a recess R which may be milled out for accepting an antenna module AM. A booster antenna BA having at least a card antenna CA component and a coupler coil CC component may be disposed on a surface of the card body CB. The booster antenna BA may comprise turns (or traces, or tracks) of wire (or other conductor) embedded in (or disposed on) the card body CB. The antenna module AM may comprise a module tape MT. An RFID chip CM may be disposed on one side of the module tape MT along with a module antenna MA for inductively coupling with the booster antenna BA. Contact pads CP may be disposed on the other side of the module tape MT for interfacing with the external contact reader. The smartcard may interface with an external contactless reader using RF signals for exchanging data and for powering the RFID chip CM.

The booster antenna BA (and other features) disclosed herein may increase the effective operative ("reading") distance between the antenna module AM and the external contactless reader with capacitive and inductive coupling. With reading distances typically on the order of only a few centimeters, an increase of 1 cm can represent a significant improvement.

A passive transponder device comprising an RFID chip or die connected to an antenna may be incorporated as a chip module or antenna module AM in RFID devices such as smartcards, tags and security documents. The antenna (or module antenna "MA") can be wire wound, wire embedded, chemically etched (copper, silver, aluminum), sputtered and printed (conductive inks) on a variety of substrates. Such cards, tags and documents may comprise several substrate layers protecting the transponder device, and the layers may be laminated to form a composite product.

The descriptions that follow may be mostly in the context of dual interface (DI, DIF) smartcards, and may relate mostly to the contactless operation thereof. Many of the teachings set forth herein may be applicable to electronic passports, keyless (contactless) entry systems and the like having only a contactless mode of operation.

Booster Antennas

Booster antennas (BA) in the card body (CB) of a smartcard improve coupling between the antenna module (AM) with an external contactless reader, Several examples of booster antennas (BAs) are shown and described in the following applications or publications.

- U.S. Ser. No. 13600140 filed 30 Aug. 2012 (US 20130075477; 28 Mar. 2013)
- U.S. Ser. No. 14020884 filed 8 Sep. 2013 (US 20140091149; 3 Apr. 2014)
- U.S. 61905134 filed 15 Nov. 2013
- U.S. 61914996 filed 12 Dec. 2013
- U.S. Ser. No. 14173815 filed 6 Feb. 2014

Generally, a booster antenna BA may comprise a single length of wire, having two free ends "a" and "f", mounted to (or embedded in) a surface of a synthetic substrate (or card body CB), and may comprise a card antenna CA component disposed around the periphery of the card body CB, a coupler coil CC component disposed at an interior area of the card body CB at a location corresponding to the location of an antenna module AM, and an extension antenna EA disposed at an upper portion of the card body CB.

Each of the booster antenna components (CA, CC, EA) may comprise several turns (or tracks) of wire which may be laid in a clockwise CW direction (with a first "sense") or in a counter-clockwise CCW direction (with an opposite "sense"). The pitch of the turns may be different for each of the booster antenna components (CA, CC, EA). The turns of a given booster antenna component (CA, CC, EA) may be organized into a number of turns comprising an inner winding (IW, iw) and a number of turns comprising an outer winding (OW, ow) disposed around the inner windings of the component. The laying of the various booster antenna components (CA, CC, EA) may involve wire crossing over previously laid components, or portions thereof.

FIG. 1A shows an exemplary booster antenna BA comprising a card antenna CA component, a coupler coil CC component and an extension antenna EA component. The overall booster antenna BA may have two free ends "a" and "f", and may be formed by embedding wire in an inlay substrate (or card body), such as in the following illustrative steps "1" to "5":

1. starting at the free end "a" of the card antenna CA component, laying the wire for the outer winding OW, in a clockwise CW direction, from an innermost turn to an outermost turn thereof, around (just within) the periphery of the card body CB (not shown),
2. then, crossing over the already laid turns of the outer winding OW of the card antenna CA component, heading towards the interior of the card body CB and commencing laying the wire for the coupler coil CC component, in a counter-clockwise CCW direction, from an outermost turn to an innermost turn thereof,
3. then, crossing over the already laid turns of the coupler coil CC component, commencing laying the wire for the extension antenna EA component, in a counter-clockwise CCW direction, from an outermost turn to an innermost turn thereof,
4. then, crossing over the already-laid turns of the extension antenna EA component, heading back towards the periphery of the card body CB and commencing winding the inner winding IW of the card antenna CA component in a clockwise CW direction, from an innermost turn to an outermost turn thereof, within the already laid outer winding OW,
5. finishing laying of the wire for the booster antenna BA at the free end "f", which may be (but need not be) close to the other free end "a".

FIG. 2A is a schematic diagram and FIG. 2B is a cross-sectional view of an antenna module 200. The antenna module 200 comprises an RFID chip CM 208, an antenna structure "A" 210 having two ends (1,2), an antenna structure "B" 212 having two ends (3,4) and an antenna structure "C" having two ends (5,6). The antenna structures A,B,C are connected as shown, with the ends "3" and "6" being free ends. The antenna structures B and C may be considered to be capacitive stubs.

FIG. 2C is a diagram showing a module tape (MT) having two antenna structures, or module antenna segments (MA1, MA2). The two module antenna segments MA1, MA2 may be arranged concentric with one another, as inner and outer antenna structures. Both module antenna segments MA1, MA2 may be wound coils, or patterned tracks, or one may be a wound coil and the other a pattern of tracks. The two module antenna segments MA1, MA2 may be interconnected with one another in any suitable manner to achieve an effective result. For example, the two module antenna segments MA1, MA2 may be connected in any suitable manner with one another. The antenna segments (MA1, MA2) may be considered to be two antenna structures (AS1, AS2).

FIG. 2D is a diagram showing one possible way how the two antenna segments MA1, MA2 of FIG. 2C may be connected with one another. Herein the two antenna segments are referred to as inner segment IS and outer segment OS, and the antenna structure comprises an outer segment OS having an outer end 7 and an inner end 8 an inner segment IS having an outer end 9 and an inner end 10 the outer end 7 of the outer segment OS is connected with the inner end 10 of the inner segment IS the inner end 8 of the outer segment OS and the outer end 9 of the inner segment IS are left unconnected this forms what may be referred to as a "quasi dipole" antenna structure AS.

Such an arrangement is shown and described in U.S. Pat. No. 8,474,726 for use as a booster antenna BA in the card body CB of a smartcard SC Such an arrangement is shown and described in U.S. Pat. No. 8,366,009 for use as a booster antenna BA in the card body CB of a smartcard SC FIGS. 2E, 2F illustrate that the antenna MA may be formed on an antenna substrate AST which may be substantially the same size as and separate from a module substrate (or tape) MT. An opening OP in the antenna substrate AST, which may be only slightly larger than the chip CM, may be provided through the antenna substrate AS for accommodating the chip CM (the chip CM may protrude through the opening OP) when the antenna substrate AST is joined (and connected) to the module substrate MT. In FIG. 2E, the chip CM and its interconnections are shown in dashed lines. As best viewed in FIG. 2F, the antenna substrate AST may be and may have bumps on its bottom (as viewed) surface which will be connected with corresponding pads on the top (as viewed) surface of the module substrate MT, such as by using a conductive adhesive. By avoiding the problem of leaving the area around the chip CM free for interconnects, this area can be used for additional turns (or tracks) of the antenna MA. Some of these additional tracks are shown in dashed lines in FIG. 2E. The antenna substrate AST may be opaque, or dark in color to conceal the underling module substrate MT, chip CM and antenna MA. This may be an important security feature if the module substrate MT is transparent (such as the PET substrate used by Parlex).

The antenna MA may be formed of wire, embedded in the antenna substrate AS, such as shown in U.S. Pat. No. 6,233,818. Alternatively, the antenna MA may be chemically etched from a metal layer (foil) on the antenna substrate AST. Alternatively, the antenna MA may be laser etched, which may allow for finer pitch, and more tracks. For example, the antenna may be laser etched (isolation technique) into a copper cladded "seed" layer (face-down side of the pre-preg) having a thickness of 18 μm, using a UV or Green nanosecond or picosecond laser with a distance between tracks dimensionally equal to the width of the laser beam, approximately 25 μm. After the laser etching of the copper seed layer, the antenna substrate AS may further be processed by one or more of sand blasting to remove residual laser ablated particles and to prepare for plating adhesion; depositing carbon to support the through-hole plating of the vertical interconnects; dry film application and photo-masking process; electroless deposition copper (Cu~6 μm) to increase the thickness of the tracks; electro-plating of nickel and nickel phosphorous (Ni/NiP~9 μm) or nickel (Ni~9 μm) and palladium/gold or gold(Pd/Au or Au –0.1 μm/0.03 μm or 0.2 μm) to prevent oxidization.

FIG. 2G shows an antenna module AM comprising two module tape layers MT1 and MT2, each layer having an antenna coil MA1 and MA2, respectively. The antenna module AM may comprise two layers of an insulating material such as PET or copper clad epoxy glass, each having an antenna with approximately 12 turns. The layers may each be considered to be module tapes MT, and may each be considered to be an antenna substrate AST. A first one of the layers (the bottom layer in the figure) MT1 may be double-sided, having a first antenna structure (or coil) MA1 formed or disposed on one side thereof and a contact interface with contact pads CP on the other side thereof. A second one of the layers (the top layer in the figure) MT2 may have an second antenna structure (or coil) MA2 formed on one side thereof, and an opening for receiving and positioning a chip, which may be a flip chip. The two antenna coils (MA1, MA2) may be considered to be two antenna structures (AS1, AS2), and may be formed by tracks of conductive material (such as copper) separated by spaces.

The RFID chip CM may be connected to pads associated with interconnect traces and vias on the first (bottom) layer MT1. The first and second antenna structures MA1, MA2 may be interconnected to form the module antenna MA, such as in series with one another, and may be connected to the chip CM. A resulting dual interface (DIF) module may have six (6) contact pads CP, and may measure approximately 10.8×8.2 mm FIG. 2H shows a module antenna MA formed on a winding core WC (which may also be referred to as a dam structure DS) mounted to a module tape MT and having a flange F. The module antenna MA comprises a single length of wire having two ends "a" and "b", both ends extending outward from the module antenna MA and connected with a respective one of two bond pads BP-a and BP-b on the carrier tape MT. The module antenna MA may comprise 18 turns of wire around the winding core WC. The wire may generally be wound around the body portion B of the winding core WC one turn atop the other, expanding radially outward as the winding area between the carrier tape MT and the flange F becomes filled with wire-resulting, for example, in three (3) layers of wire, each layer having six (6) turns. Ferrite or magnetic particles may be incorporated into the winding core WC.

FIG. 2I shows diagrammatically a module antenna MA comprising two coils C1 and C2, each of the coils having 9 turns, the overall module antenna MA having a total of 18 turns. Each of the coils C1 and C2 has two ends. Coil C2 is shown with "X's". Coil C2 is shown wound around the coil C1. The module tape MT is shown as being double-sided, but may be single-sided. The coil C1 may be the first coil wound on the winding core WC, and may comprise 9 turns of wire and two ends $1a$, $1b$. The coil C2 may be the second coil wound on the winding core WC, and may comprise 9 turns of wire and two ends $2a$, $2b$. Ferrite or magnetic particles may be incorporated into the winding core WC.

FIG. 2J shows schematically that the two coils C1 and C2 may be connected in parallel with one another. Coil C2 is shown in dashed lines. A first end $2a$ of the second coil C2 may be connected with a first end $1a$ of the first coil C1 at a first bond pad BP-a. A second end $2b$ of the second coil C2 may be connected with a second end $1b$ of the first coil C1 at a second bond pad BP-b. Other antenna structures (AS) disclosed herein may be connected with one another in a similar manner.

The module antenna MA having two coils C1, C2 may couple better with a booster antenna BA on the card body, or directly with an external contactless reader, when contrasted with a comparable (substantially the same size, same total number of turns, etc.) module antenna MA having but a single coil, resulting in a greater read-write distance and energy harvesting, and potentially rendering the booster antenna BA superfluous. This may be attributable to the RF signal being radiated (or received) by the two coils reinforcing one another, or a higher quality factor (Q), or another characteristic of the two coil versus one coil approach including, perhaps, capacitance formed by the parallel connected ends of the two coils.

FIG. 2K illustrates the concept of providing a connection bridge CBR, generally. Metallization on one side (front; top, as viewed) of the module tape MT may be patterned to have contact pads CP (one shown) and a connection bridge CBR (one shown). For purposes of this discussion, the module tape MT may be single-sided tape having metallization on only one side thereof, as illustrated. The concepts presented herein may also be applicable to double-sided tapes having metallization on both sides thereof.

An RFID chip CM component may be provided on the other (back; bottom as viewed) side of the module tape MT. A module antenna MA component may also be provided on the other side of the module tape MT (on the same side as the RFID chip CM).

The module antenna MA in this example is a wire-wound antenna comprising a wire having two ends a and b, which may be wound on a dam structure (DS; or winding core WC). Generally, the two ends of the module antenna MA need to be connected with corresponding two terminals LA and LB of the RFID chip. The dam structure DS may be located on the opposite side of the module tape MT from the connection bridge CBR, and may be aligned under the connection bridge CBR. The dam structure DS (or winding core WC) has an interior portion (to the right, as viewed) and an exterior portion (to the left, as viewed). The module antenna MA is wound on the exterior of the dam structure DS. The RFID chip CM is disposed on the module tape MT in the interior of the dam structure DS. Ferrite or magnetic particles may be incorporated into the dam structure DS.

The connection bridge CBR extends from a first position above the exterior portion of the dam structure DS to a second position above the interior portion of the dam structure DS. A first opening 20 ("h") may be provided through the module tape MT at the first position. A second opening 22 ("h") may be provided through the module tape MT at the second position. A first portion 30 of the connection bridge CBR is disposed over the first opening 20 A second end portion 32 of the connection bridge CBR is disposed over the second opening 22. A first end a of the module antenna MA may be wire-bonded, through the first opening 20 to the underside of the first portion 30 of the connection bridge CBR, and that a first terminal LA of the RFID chip CM may be wire-bonded, through the second opening 22 to the underside of the second portion 32 of the connection bridge CBR. The openings 20, 22 may be referred to as "blind holes", since the are covered at their top ends by the connection bridge CBR.

The connection bridge CBR provides a conductive path which extends from a position which is exterior to the dam structure DS to a position which is interior to the dam structure DS. This facilitates connecting a component (such as the module antenna MA) which is disposed external to the dam structure DS to a component (such as the RFID chip CM) which is disposed internal to the dam structure DS. The connection bridge CBR serves as an interconnect between an end of the module antenna MA component and a terminal of the RFID chip CM component.

At least one of the contact pads (CP) may be modified to establish at least one connection (including two or more connections) between components on the other, opposite (back) side of the module tape MT, such as the module antenna (MA) component and the RFID chip (CM) component.

This is illustrative of making connections between components which may be disposed on one side (the "chip side") to components on the opposite side ("contact side") of the module tape, such as for connecting the module antenna MA to the RFID chip CM.

FIG. 2L is a diagram showing contact pads C1-C3, C5-C7 for a 6-pad contact pad array. The signal assignments for the contact pads may be,

| | |
|---|---|
| C1 | VDD |
| C2 | RST_N |
| C3 | CLK |
| C5 | VSS |
| C6 | not used |
| C7 | IO 1 |

FIG. 2M shows a contact pad array area disposed in a rectangular punch out area of a layer of a module tape MT. Remaining foil on the contact side of the module tape MT may be patterned to have one or more connection bridges (CBR). The remaining foil may be in an elliptical area surrounding the contact pad area.

Four areas of conductive foil (or cladding), on the contact side of the module tape MT, outside of the ISO 7816-2 area for contact pads are shown. The two areas (shaded) shown at the top and bottom of the contact pad array area are labeled "connection bridge". The two areas (shaded) shown to the left and right of the contact pad array area are labeled "logo/branding". The areas labeled "connection bridge" may have logo/branding. The areas labeled "logo/branding" may function as connection bridges (CBR).

The module antenna MA (or multiple module antennas) and chip module CM may be located on the other side ("chip side") of the module tape, and may be interconnected to positions, shown as dark dots, with one another by connections to the underside of one or more of the connection bridges (or logo/branding areas). These connections (two shown) may be entirely outside of the contact pad array area.

FIG. 2N shows an example of an antenna module AM (which may be referred to as a chip module) 250 comprising a substrate (or module tape MT) 252, contact pads (CP) 260 on a "contact side" (or face-up side) of the module tape MT, an RFID chip (CM) 270 on an opposite "chip side" (or bond side, or face-down side) of the module tape MT, and an exemplary wire-wound module antenna MA1 280 on the chip side thereof. As a general proposition, the more antenna that can be formed in the available space of the antenna module AM, the better the performance of the antenna module AM may be, thereby easing demands on the booster antenna BA to effect acceptable communication between the smartcard (or chip card) and an external reader.

An etched module antenna MA2 290 may be formed on the contact side of the module tape MT underneath the contact pads CP. An exemplary 4 turns of the etched module antenna MA2 are shown. The etched module antenna MA2 may be covered by a dielectric layer 292, for example an adhesive layer, alternatively a polymer, for example PET. Alternatively, the etched antenna may comprise (or be formed from) a layer of polyimide or FR4 glass epoxy clad with copper (the copper being used to construct the contact pads). Openings through the module tape and connection bridges may enable connecting the chip with the etched antenna. The module antennas (MA1, MA2) may be considered to be antenna structures (AS1, AS2), and may both be formed by etching an electrically-conductive foil or cladding on the face-up and face-down sides of the module tape MT.

The use of the techniques disclosed herein may permit the production of larger antenna structures (AS) or multiple antenna structures in the area surrounding the RFID chip (CM) on the bonding side (chip side, face-down) of the antenna module (AM) than would be otherwise possible with a normal sized module, as well as having antenna structures (AS) on both sides of the module tape MT. In addition, the use of connection bridges (CBR) may facilitate the connection of these antenna structures to the RFID chip.

Laser Etching

Laser etching is a form a laser ablation where material may be removed from a typically planar sheet (or foil) of material, and has some advantages over conventional wet etching. A laser etch can proceed more uniformly through the material being etched, and can also be controlled such as by increasing or decreasing the laser power and subsequent etching at various portions of a pattern being etched, in a highly-controllable manner. (With conventional wet/chemical etching, the width of the etch may be tapered, narrowing from the surface of the material being etched to the bottom of the etched feature. In contrast therewith, with laser etching, straight wall etching can be achieved whereby the sides of the feature being etched may be substantially parallel with one another.) The material subjected to laser etching, or substrate supporting the laser etched material, may be chosen to be stable at elevated temperatures and may be a non-flammable material.

The contact pads CP and some of the antenna structures AS described herein may be formed using laser etching (isolation technique) of copper cladded "seed" layers on a module tape MT using a UV nanosecond or picosecond laser. A seed layer may have a thickness of approximately 18-35 μm. For the antenna structures AS, the space between tracks may be dimensionally equal to the width of the laser beam, approximately 25 μm. The tracks themselves may have a width of 25-100 μm.

After laser etching of the copper seed layer to pattern and/or to perforate the contact pads CP or antenna structure(s) AS, the module tape MT may be further processed as follows:
 sand blasting (or other suitable process) to remove residual laser ablated particles and to prepare for plating adhesion;
 depositing carbon to support the through-hole plating of the vertical interconnects;
 dry film application and photo-masking process;
 electrodepositing copper (Cu~6 μm) to increase the thickness of the patterned (for CP or AS) seed layer on both sides of the tape;
electroless plating of nickel and nickel phosphorous (Ni/NiP~9 μm) or nickel (Ni~9 μm) and palladium/gold or gold (Pd/Au 0.1 μm/0.03 μm) or gold (0.2 μm) to prevent oxidization.

The module antenna (MA) may include a laser etched antenna or a chemically etched antenna with a varying spacing between tracks to regulate the capacitive component of the inductive capacitive resistive circuit (LCR) and achieve a high Q factor with a broad bandwidth around the resonant frequency of 13.56 MHz.

The antenna MA may be laser etched, which may allow for finer pitch, and more tracks. For example, the antenna may be laser etched (isolation technique) into a copper cladded "seed" layer (face-down side of the pre-preg) having an exemplary thickness of approximately 18 μm, using a UV or Green nanosecond or picosecond laser with a distance between tracks dimensionally equal to the width of the laser beam, approximately 25 μm. After the laser etching of the copper seed layer, the antenna substrate AS may further be processed by one or more of sand blasting or chemical etching to remove residual laser ablated particles and to prepare for plating adhesion; depositing carbon to support the through-hole plating of the vertical interconnects; dry film application and photo-masking process; electroless deposition copper (Cu~6 μm) to increase the thickness of the tracks; electro-plating of nickel and nickel phosphorous (Ni/NiP~9 μm) or nickel (Ni~9 μm) and palladium/gold (0.1 μm/0.03 μm) or gold (0.2 μm) to prevent oxidization.

Laser Etching an Antenna Structure

Laser etching (a form of laser ablating) may be used instead of chemical etching to remove material such as metal from a conductive foil, layer or cladding for forming an RFID antenna structure.

Chemically etching antennas with 10 to 12 turns within the confinement dimensions of an ISO standard chip card module is described in U.S. Pat. No. 8,100,337 (SPS). Such an antenna module with a contact and contactless interface is implanted in a card body for inductive coupling with a booster antenna to communicate with a reader in contactless mode.

Because of the restrictions on the size of the antenna module AM (e.g. 10.6 mm×8 mm), the number of turns forming the antenna is limited to the space surrounding the central position of the silicon die which is attached and bonded to the module substrate. This substrate is generally made of epoxy glass with a contact metallization layer on the face-up side and a bonding metallization layer on the face-down side of the module. The chemically etched antenna is usually formed on the face-down side.

Another limitation in creating an inductive antenna through chemical etching is the minimum spacing between tracks, which is economically attainable using a lithographic process. The optimal spacing between (adjacent) tracks of an etched antenna on super 35 mm tape is approximately 100 μm.

An antenna structure AS, such as a module antenna MA, may be formed by laser etching a copper cladded laminate forming an integral part of an RFID smartcard antenna module AM. The use of laser etching may resolve the limiting spacing factor which can be achieved using conventional chemical etching, with the result that the number of turns which form the antenna can be greatly increased, with resulting performance benefits. Using laser versus chemical etching may also result in a significant reduction in the foot-print of the laser-etched antenna having substantially the same electrical characteristics as a chemically-etched antenna requiring a larger area, and allowing for easy placement and adhesion of the antenna module AM in a recess provided in a card body, using standard adhesive tapes.

The material being laser etched may comprise, a standard pre-preg laminate made of epoxy glass and cured halogen free epoxy resin module tape MT having with both sides cladded with copper foil (layer) having a thickness of approximately 18 μm-35 μm may be used to produce contactless and dual interface smartcard modules in rows and columns on super 35 mm chip carrier tape. The carrier tape may be provided with sprockets and index holes for transport and punching of holes for vertical interconnects to electrically connect the top and bottom metallization layers. Such punch holes for the vertical interconnects (vias) are later coated with carbon and a copper layer (2-5 μm) is deposited through chemical processing to provide for through-hole plating. The punch holes may have a typical diameter of 200 μm, but may be enlarged to a minimum of 600-700 μm in order to accept a wire bond. These holes can also be laser drilled. Alternatively, blind holes can be used to connect the chip IC (RFID chip CM) and other components on the bond side (face down side) to the contact pads CPs on the contact side (face up side) of the module tape MT.

The antenna structure AS at each module site is laser etched (isolation technique) into the copper cladded "seed" layer (face-down side of the pre-preg) having a thickness of approximately 18 μm-35 μm using a UV or Green nanosecond or picosecond laser with a distance between tracks dimensionally equal to the width of the laser beam, which may be approximately 25 μm. On the face-up side of the module tape MT, the contact pads CP can also be laser etched in preparation for electroless-plating of copper and electro-plating of nickel and gold. After the laser etching of the copper seed layer, the tape with antenna sites on the face-down side may be further processed: sand blasting to remove residual laser ablated particles and to prepare for plating adhesion; depositing carbon to support the through-hole plating of the vertical interconnects; dry film application and photo-masking process; electroless deposition copper (Cu~6 μm) to increase the thickness of the metal layers on both sides of the tape, electro-plating of nickel and nickel phosphorous (Ni/NiP~9 μm) or nickel (Ni~9 μm) and palladium/gold or gold (Pd/Au or Au-0.1 μm/0.03 μm or 0.2 μm) to prevent oxidization.

After laser etching the antenna structure or other structures (such as contact pads CP) on one or both sides of the copper clad material (FR4), the copper layer or layers can be chemically etched to remove copper (for example 2 μm) for the purpose of cleaning, removing the oxidation layer and any residual dirt between tracks, in addition to provide for better adhesion of the nickel plating. It is further possible to remove a significant amount of copper through the process of "half etching" to reduce the thickness of the copper layer.

Before chemical processing to clean, remove or add copper to the antenna structure(s), and before plating with nickel and gold, in a separate process, the copper layer(s) can be chemically etched to provide for a contact pad arrangement on the face-up side of the module tape (MT) and for a connection bridge(s) on one of the copper layers. The copper layer may be an electro-deposited copper foil treated to create a matt, shiny or plain finish. The copper foil may be composed of a passivation layer of chromium to protect the copper from oxidation and may include an inorganic layer such as zinc to improve the adhesion with the epoxy glass (FR4). The copper layer may be processed as a single layer of copper or may have a carrier support layer to facilitate its attachment to the epoxy glass tape or polyimide tape. The attachment to the tape may be an adhesive or a lamination adhesive-free process.

By using a standard pre-impregnated laminate with a seed layer of copper on both sides, it is possible to laser etch contact pads on the face-up side and an antenna structure on the face-down side, before the tape is electroless-plated with copper, and electroplated with nickel and gold. Some advantages of this technique may be the reduction in the feature spacing size between tracks and the consequent increase in permissible number of turns (tracks) within the confined area of a standard smartcard antenna module AM.

Alternatively, when producing double-sided chip carrier tape, it is possible to use a single sided copper cladded laminate comprising a 110 µm thick module tape with 18 µm copper cladding on the face-down side as a base material for the bonding (face-down) side and then laminating a copper foil having a thickness of 18 µm for the contact (face-up) side. The blind holes are electroplated with copper and in addition copper is added to both sides. The additional copper thickness is typically 5 µm on the contact side and 15 µm on the bonding side. The copper layers are then plated with Ni and Au. An example of the plating thicknesses is presented.

| Thickness Ni | Thickness Au | Thickness Pd |
|---|---|---|
| | Contact Side | |
| 2.0 (0.6; +1) µm | 0.07 ± 0.04 µm | Optional: 0.15 ± 0.05 µm |
| | Bonding Side | |
| 6.0 (3; +10) µm | 0.3 (0.1; +0.6) µm | |

Skin Effect

This is the tendency of an alternating electric current (AC) to become distributed within a conductor such that the current density is largest near the surface of the conductor, and decreases with greater depths in the conductor. The electric current flows mainly at the "skin" of the conductor, between the outer surface and a level called the skin depth. The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current.

The nominal depth of penetration for a conductor is given by:

$$\delta = \sqrt{\frac{2\rho}{\omega\mu_r\mu_0}} = \sqrt{\frac{\rho}{\pi f \mu}}$$

Where $\rho$ is the resistivity of the conductor in $\Omega$.m, $\omega$ is the angular frequency of current=$2\pi f$ (f is the frequency in Hertz), $\mu$ is the absolute magnetic permeability $\mu=\mu_0\mu_r$ ($\mu_r$=relative magnetic permeability of the conductor and $\mu_0$=the permeability of free space)

Resistivity of copper ($\rho$): $1.678\times10^{-8}$ $\Omega$.m
Frequency (f): 13.56 MHz
Relative permeability ($\mu_r$): 0.999991
Absolute permeability ($\mu_0$): $4\pi\times10^{-7}$ H/m At 13.56 MHz, the skin depth for copper is approximately 18 µm (17.7047 µm). Therefore, it may make sense to reduce the thickness of the copper layer on the face-up (contact CP) side of the module tape MT, to reduce its shielding effect on the electromagnetic field. However, a disadvantage of reducing the thickness of this copper layer may be the issue of creating dents on the face plate (contact pads CP) during ultrasonic wire bonding. When using copper with thickness less than 18 µm on the face-up side of the module, thru hole plating (rather than wire bonding) may be used to connect features on the chip side of the module to the contact pads (CP) or other features (such as connection bridges CBR) on the face-up side.

Antenna Module (AMs)

Various embodiments (examples) of antenna module AM constructions are described herein. Some of these embodiments may utilize a pre-preg laminate, or module tape MT (such as epoxy glass, polyimide film (Kapton) or any suitable flexible circuit material) having a thickness of approximately 75-100 µm, and cladded on one or both sides with copper. The copper cladding (layer) may have a thickness in the range of approximately 9 µm—35 µm, but is not limited thereto. (http://www.isola.de/ or http://www.risho.co.jp) Some of the embodiments may incorporate a copper foil (layer) laminated to the module tape MT or to its copper cladding. The copper foils may have a thickness in the range of approximately 9 µm-35 µm, but is not limited thereto. Some features of the module tape MT (which may be referred to as "antenna module substrate") may include (but are not limited to):

An exemplary polyimide film may have a metal layer of plated copper 5 µm-35 µm, a polyimide layer having a thickness of 25 µm-50 µm and an adhesive layer of acrylic (pressure sensitive adhesive) or thermoplastic polyimide as the adhesion layer. A second metal layer may also be applied to the polyimide.

The copper layer for the contact pads CP may be an electro-deposited copper foil having a matte or shiny appearance with chromium treatment on both sides to protect against oxidation. The foil may have a rough zinc layer (nodular copper with deposited zinc) on one side to facilitate the adhesion of the copper foil with the tape.

Generally, two types of module tape MT are available: (i) "single-sided" module tape having copper cladding (layer) on one side only of the module tape MT, and (ii) "two-sided" module tape having copper cladding on both sides of the module tape MT. In a first step of some of the manufacturing processes disclosed herein, a single-sided or double-sided tape may be provided (such as punched) with sprocket holes and index holes for transporting the tape through automated production machinery. Additional holes may be punched through the tape allow for electrical connections subsequently to be made, so-called vertical interconnects (or vias), between the copper layers on both sides of the antenna module substrate AMS. Blind holes may be used as an alternative to plated thru holes. One layer may be used to form an antenna structure AS, the other layer may be used to form contact pads CP for the ISO 7816 interface. Other possibilities are disclosed herein, including the use of separate copper foil as a layer on the antenna module substrate AMS or module tape MT.

One or more antenna structures AS may be disposed on the face-down side of an antenna module AM, and connected with an RFID chip CM which may also be disposed on the face-down side of the antenna module AM. The module antenna MA may interact contactless (by RF) with an external contactless (ISO 14443) reader. For a dual interface smartcard, the RFID chip CM may be connected, through the module tape MT, with selected ones of contact pads CP on the opposite, face-up side of the antenna module AM. The contact pads CP may interact by physical contact with an external contact (ISO 7816) reader.

Some Embodiments of Antenna Modules (AM)

Various embodiments of Antenna Modules (AM) will be illustrated and described. For the sake of illustrative clarity, various particular features or elements may be emphasized in some of the descriptions and illustrations, and others omitted.

FIG. 3A is a diagram illustrating a construction of an antenna module AM based on a single-sided module tape MT which may comprise a glass-epoxy tape substrate having copper cladding on a face-down side thereof, and a copper foil laminated to the a face-up side thereof, such as for producing an antenna module AM having a module antenna MA comprising two antenna structures (or an inner winding IW and an outer winding OW of a single antenna structure) on the face-down side thereof. Some of the elements shown therein may include:
Copper foil, 9-18 μm
Adhesive, 20 μm
Glass epoxy, 75 μm
Jumper
Laser etched copper cladding, 35 μm
Plated through holes (or vias) or blind holes FIG. 3A illustrates an antenna module (AM) 300A comprising a single-sided module tape (MT, or SSMT) 302 having an electrically-conductive cladding layer (CL) 310 on one side (the face-down side) thereof. (The cladding layer CL is shown fixed to the module tape MT, rather than exploded.) The module tape MT may comprise glass epoxy having a thickness of approximately 75 μm. The cladding layer CL may comprise copper (or other electrically-conductive material), and may have a thickness of approximately 35 μm. The module tape MT in this embodiment (example) is oriented with the cladding layer CL facing down (as viewed), and it may be used to form tracks of an antenna structure AS (or multiple antenna structures). The cladding layer CL may be referred to hereinafter as copper cladding layer, (CCL) although it may comprise metal other than copper. (Throughout the descriptions of FIGS. 3A-3G, the antenna modules AM 300A-300G may be referred to simply as "300".)

The cladding layer CL 310 may be etched in any suitable manner, such as laser ablated, to create an antenna structure AS 320 comprising a number of electrically-conductive tracks 322 separated by spaces 324. (It is the spaces between tracks that are etched away from the copper layer material, leaving tracks). This may result in a planar (flat) spiral antenna structure AS having at least one long, continuous track comprising several turns, separated by spaces, and having two ends for connecting to an RFID chip CM 308. The electrical parameters of such a resulting planar antenna structure may be determined by inductance (related to the number of turns), capacitance (related to the spacing between tracks) and resistance (related to the material and cross-sectional area of the tracks). This cladding layer CL with antenna structure AS formed therein may be disposed on the "face-down" or "bonding" side of the module tape MT, which will also support the RFID chip CM. Other features such as bond pads and interconnect traces for electrically connecting the antenna structure AS to the RFID chip CM may also be formed in the copper layer during the etching process.

The antenna structure AS formed in the copper cladding layer CCL may comprise an inner winding IW and a separate outer winding OW disposed exterior to (but generally on the same plane as) the inner winding IW. (The antenna structure AS may serve as the module antenna MA for the antenna module AM. Moreover, each of the inner and outer windings IW and OW, may be considered to be a separate antenna structure AS1 and AS2, respectively.) The outer winding OW is illustrated as having two tracks, and the inner winding IW is illustrated as having 4 tracks. The number of tracks may be different, and may generally be more than are shown. For example, each of the inner and outer windings may comprise 8-10 tracks. Each of the inner and outer windings IW and OW may have two ends, and they may be connected with each other and with the RFID chip CM in various ways, such as in series with one another, in parallel with one another, in "reverse-phase" with one another, and the like.

A plated-through hole (or via) 316 is shown extending from one end (in this example, an inner end) of the inner winding IW, through the module tape MT to the top (as viewed) side thereof. Similarly, a plated-through hole (or via) 318 is shown extending from one end (in this example, an inner end) of the outer winding OW, through the module tape MT to the top (as viewed) side thereof.

An electrically-conductive jumper 317 may be disposed on the top (as viewed) side of the module tape MT to connect the two vias 316 and 318 to one another, thereby electrically connecting the one end of the inner winding IW to the one end of the outer winding OW. The top surface of the module tape MT may be modified, creating a recess, to accept the jumper. The jumper can be a metal insertion, a link, a clamp, a lead, an insulated wire or a deposited metallization layer.

The other (in this example, outer) ends of the inner winding IW and outer winding OW may be connected in any suitable manner, such as by bond pads and interconnection traces, to terminals of the RFID chip CM, details of which are omitted, for illustrative clarity.

Additional structures may be formed in or on the cladding layer, such as interconnect traces and bond pads. A silicon capacitor component 314 may be mounted to and wire bonded to the face-down side (bonding side) of the module tape MT. Such silicon capacitors are available from http://www.ipdia.com/. These structures (including the antenna structure) and components are shown only generally (details omitted), for illustrative clarity.

An electrically-conductive foil layer (FL, or CFL) 330, such as a layer comprising copper, may be laminated with an adhesive (insulation) layer 332 to the top (as viewed) surface of the module tape MT. An exemplary copper foil layer CFL 330 may have a thickness of 9 μm-18 μm, which is less than the skin depth (~18 μm) for copper. (As used herein, "less than" may be interpreted as "not greater than".) The adhesive layer may have a thickness of approximately 20 μm. The copper foil layer CFL may be processed (etched or otherwise patterned) to form an array of 6 or 8 contact pads (CP) for the antenna module AM, on the face-up side of the antenna module AM. Also, one or more connection bridges (CBR), logos and/or aesthetic features (compare FIG. 2M) may be formed in the copper foil layer CFL.

In some embodiments disclosed herein, a copper layer (foil or cladding) on the face-up side of the antenna module AM is exemplary of an electrically-conductive layer and may have a thickness less than the skin depth of copper at the frequency of interest, and is suitable for being patterned to have contact pads (on the face-up side of the antenna module AM). At 13.56 MHz, the skin depth for copper is approximately 18 μm. Electrically-conductive materials (metals) other than copper may be used—for example aluminium, which has a skin depth of 23 μm at 13.56 MHz. In the main, hereinafter, electrically-conductive (or simply "conductive") layers (which may be cladding or foil) comprising copper will be described.

An antenna structure (AS) may function as a module antenna (MA) for a dual-interface antenna module (AM) and, when the module antenna (MA) is connected to an RFID chip (CM), improved communication performance may be achieved with an external contactless RFID reader (FIG. 1) as a result of the reduced thickness (less than skin depth) of the conductive layer (CL) for the contact pads (CP). Antenna structures (AS) may be disposed on a (face-down) side of the module tape (MT) opposite the contact pads (CP) and/or between the contact pads (CP) and the module tape (MT).

Since the contact pads (CP) must be mechanically robust, to sustain making many thousands of connections with an external reader, a portion of a given contact pad may be thicker than the skin depth, for example, 25 μm. For example, copper contact pad(s) may be patterned, like a waffle, to have a grid of intersecting thick portions or ridges (>18 μm) separated by thin areas (<18 μm). Hence, it can be said that "at least a portion of" the layer for forming the contact pads may have a thickness less than the skin depth for copper at the given frequency, and the thin portion may account for at least 50% (including at least 75%, and at least 90%) of the surface area of the layer (foil or cladding) remaining after patterning (i.e., the contact pad array). See, for example, FIG. 7B of US 20130126622, incorporated by reference herein, which shows an example of thinning selected areas of at least some of the contact pads. Also, for wire bonding from below the contact pad (or a connection bridge), it may be desirable to have a portion of the contact pad thicker than the skin depth to endure the force associated with wire bonding, without denting.

Using laser etching to produce module antennas, as discussed herein, can demonstrate performance advantages over antennas produced by traditional means such as chemical etching. The chemical etching process, in general, can produce limited minimum feature sizes in the range of 100 μm. Chemical etching also results in undercutting of the walls of etched features, further limiting feature sizes and shapes and affecting adhesion of features to a given substrate. A chemically etched module antenna may typically feature a minimum track width of approximately 100 μm with spacing of approximately 100 μm between adjacent tracks. In contrast therewith, laser etching can produce minimum feature sizes approximately as small as the focused laser spot, typically approximately 25 μm but possibly as small as approximately 10 μm. Additionally, laser etching can produce etched features having vertical walls with no undercutting. In contrast to chemical etching, a laser etched module antenna may typically feature track widths of 25 μm with spacing of 25 μm between adjacent tracks.

The smaller feature sizes attainable by laser etching can significantly change, and improve, the electromagnetic properties of a module antenna. For example, consider a module antenna approximately 10 mm×11 mm having 12 turns with track width 50 μm. Changing the track spacing from 50 μm to 25 μm may increase the resistance of the coil by approximately 17% and may increase the inductance by approximately 15%. Changing from 100 μm to 25 μm may produce even more profound/beneficial results. Comparing similarly shaped antennas of different sizes, it can be shown that changes in resistance and inductance of over 60% are possible by varying the feature size in the range 25 μm to 100 μm. Additionally, changes in feature sizes may advantageously affect the inter-turn capacitance of the module antenna. Combining changes in resistance, inductance and capacitance in etched module antennas, through the use of laser etching as discussed herein, can be used to enhance the performance of etched module antennas. This can result in improved overall module antenna performance through improved coupling to a booster antenna, yielding improved read/write range, and may enable operation of the transponder (antenna module) directly with an external reader (FIG. 1), without the use of a booster antenna.

Some additional manufacturing steps may be performed, such as wet processes to add additional copper to the copper foil layer CFL on the face-up side (contact side) of the module tape MT and to the copper cladding layer CCL on the face-down side (bonding side) of the module tape MT. The additional copper thickness could be a flash of 2 μm on the contact side and 5 μm on the bonding side. Openings or punched holes (for vias) in the module tape MT permit additional copper to be grown on the underside of the laminated copper foil layer CFL on the top side of the module tape MT, making conductive via connections, from the contact pads CP on the face-up side of the module tape MT, through the module tape MT, to bonding pads formed from the copper cladding layer CCL on the bottom side of the module tape MT. Chemical etching to reveal additional features such as the remaining portions of the antenna structure AS and/or contact pads CP can follow. In a subsequent step, the copper layers can be plated with nickel and gold to avoid oxidation.

FIG. 3B is a diagram illustrating a construction of an antenna module AM based on a single-sided module tape MT which may comprise a glass-epoxy tape substrate having copper cladding on a face-up side thereof, and a copper foil laminated to the face-down side thereof, such as for producing an antenna module AM having a laser-etched antenna structure AS which may be produced "off line" and later mounted to the face-down side of the module tape MT. Some of the elements shown therein may include:
Copper cladding, 9 μm-18 μm
Glass epoxy, 75 μm-100 μm
Adhesive, 20 μm
Laser etched copper foil, 35 μm
Release Layer FIG. 3B illustrates an antenna module 300B comprising a single-sided module tape MT 302 having a copper cladding layer CCL 330 on one side. The module tape MT may comprise glass-epoxy, and may have a thickness of approximately 75 μm-100 μm. The copper cladding layer CCL may have a thickness of approximately 9 μm-18 μm (less than the skin depth for copper). The module tape MT in this embodiment (example) is oriented with the copper cladding layer CCL facing up (as viewed), as it will be used to form contact pads (CP) of a contact pad array.

A copper foil layer CFL 310 having a thickness of approximately 35 μm may patterned in any suitable manner, such as by etching, more particularly by laser etching, to have tracks 322 (separated by spaces 324) of an antenna structure AS 320. The copper foil layer CFL may also be etched to have bond pads and interconnect traces. The copper foil layer CFL may be disposed on a release layer 326. The etched copper foil layer CFL, patterned as an antenna structure AS, to perform the role of module antenna MA, may be produced off-line, and may subsequently be laminated (joined) to the bottom (as viewed) surface of the module tape MT, such as with a layer of adhesive 312 having a thickness of 20 μm. An RFID chip CM 308 is shown, and may extend through an opening in the adhesive layer.

FIG. 3C is a diagram illustrating a construction of an antenna module AM based on a double-sided module tape MT which may comprise a glass-epoxy tape substrate having copper cladding on both the face-up and face down sides thereof, and a copper foil laminated to the a face-down side thereof, such as for producing an antenna module AM having a laser-etched antenna structure AS which may be produced "off line" and later mounted to the face-down side of the module tape MT. Some of the elements shown therein may include:
Copper cladding, 9 μm
Glass epoxy, 75 μm or 100 μm
Copper cladding, 9 μm
Adhesive, 20 μm
Laser etched copper foil, 35 μm FIG. 3C illustrates an antenna module 300C comprising a double-sided module tape MT 302 having a first copper cladding layer CCL-1 330 on its top (as viewed) side and a second copper cladding layer CCL-2 332 on its bottom (as viewed) side. The module tape MT may comprise glass-epoxy, and may have thickness of approximately 75 μm-100 μm. The copper cladding layers CCL-1 and CCL-2 may comprise copper (or other electrically-conductive material(s)), and may each have a thickness of approximately 9 μm-18 μm (less than the skin depth for copper). The module tape MT in this embodiment (example) is oriented with the one copper cladding layer CCL-1 facing up (as viewed), as it will be used to form contact pads (CP) of a contact pad array (CPA). The other copper cladding layer CCL-2 is facing down (as viewed), and may be used to form structures or components (not shown) such as, but not limited to interconnect traces (interconnects, including a jumper) or an antenna structure (AS).

A copper foil layer CFL 310 having a thickness of approximately 35 μm may patterned, such as by etching, more particularly by laser etching, to have tracks 322 separated by spaces 324 of an antenna structure AS 320. The copper foil layer CFL may also be etched to have bond pads BP 326 and interconnect traces. The copper foil may be disposed on a release layer (not shown). The etched copper foil layer CFL may be laminated to the bottom (as viewed) surface of the module tape MT, such as with an adhesive 312 having a thickness of 20 μm. An RFID chip CM 308 is shown, and may extend through an opening in the adhesive layer.

FIG. 3D is a diagram illustrating a construction of an antenna module AM based on a single-sided module tape MT which may comprise a glass-epoxy tape substrate having copper cladding on a face-down side thereof, and a copper foil laminated to the a face-up side thereof, with an additional layer of copper foil laminated to the face-down side thereof, such as for producing an antenna module AM having two module antenna structures (AS1, AS2) on the face-down side thereof. Some of the elements shown therein may include:
contact side copper foil, 9 μm-18 μm
adhesive, 20 μm
glass epoxy module tape, 75 μm-100 μm
cladding for antenna AS1, 9 μm (laser or chemically etched)
adhesive, 20 μm
foil for AS2, 35 μm (may be chemically etched)

FIG. 3D illustrates an antenna module 300D comprising a single-sided module tape MT 302 having a copper cladding layer CCL 310 on one side. The module tape may comprise glass-epoxy, and may have a thickness of approximately 75 μm. The copper cladding layer CCL may have a thickness of approximately 9 μm. The module tape MT in this embodiment (example) is oriented with the copper cladding layer CCL facing down (as viewed), and it may be used to form tracks of an antenna structure (AS1), which may be one of two or more antenna structures.

The copper cladding layer CCL may be etched in any suitable manner, such as laser ablated, to create an antenna structure AS1 320 comprising a number of conductive tracks separated by spaces. This may result in a planar (flat) spiral antenna structure AS1 having one long, continuous track making several turns, separated by spaces, and having two ends for connecting to the chip module CM (or to another antenna structure AS2). The copper cladding layer CCL may also be etched to have bond pads and interconnect traces (not shown). A large opening (or void) may be left in a (central) portion of the copper cladding layer CCL to accommodate mounting an RFID chip (CM) 308 to the face-down side of the module tape MT.

A copper foil layer CFL 350 having a thickness of approximately 35 μm may patterned, such as by etching, more particularly by laser etching, to have tracks (separated by spaces) of an antenna structure AS2 340. The copper foil layer CFL may also be etched to have bond pads and interconnect traces (not shown). A large opening (or void) may be left in a (central) portion of the copper foil layer CFL to accommodate mounting an RFID chip (CM). The etched copper foil layer CFL (AS2) may be laminated to the bottom (as viewed) of the antenna structure AS1 on the bottom of the module tape MT, such as with an adhesive 352 having a thickness of 20 μm.

A copper foil layer CFL 330 having a thickness less than the skin depth of its material (e.g., copper) at the frequency of interest (e.g., 13.56 MHz) may be mounted, using an adhesive 332 to the face-up side of the module tape MT, and may be patterned to have an array of contact pads CP.

There have thus been described a number of embodiments (examples) of antenna modules AM having one or more antenna structures (AS, AS1, AS2, IW, OW), at least some of which may be formed by laser etching, disposed on the face-down side of a module tape (MT), and also conductive (copper) cladding or foil used for contact pads (CP) and having a thickness less than the skin depth of the conductive material (e.g., copper) being used for the contact pads (CP) on the face-up side of the antenna module AM.

The less-than-skin-depth thickness of the contact pads CP (for a given material such as copper, at a given frequency such as 13.56 MHz) may reduce attenuation of an electromagnetic field which would otherwise be caused by thicker-than-skin-depth contact pads CP, resulting in improved (or increased) reading distance between the antenna module AM and an external reader. This, along with some other techniques disclosed herein, may significantly relax the requirements upon a booster antenna BA in the card body CB of the smartcard SC, including eliminating the booster antenna BA. This feature may be applicable to single-sided module tapes as well as double-sided module tapes.

The conductive cladding or foil forming the contact pads CP may initially have a thickness which is less than the skin depth (of copper). Alternatively, the cladding or foil may initially have a thickness which is greater than the skin depth (of copper) and may be etched back to remove some of its thickness so that its resulting thickness is less than the skin depth (of copper). Having the thickness of the copper to be below the skin depth (at a given frequency) will increase the impedance of the metal under alternating current. This has the effect of reducing eddy current losses in the metal. Thus, reducing the thickness of the contact pads CP on the contact side of the module reduces attenuation of the applied electromagnetic field thereby increasing the communication performance of the module with an external RFID reader (ISO 14443). This principle may also apply to other metals or metal alloys where the metal or metal alloy thickness is less than the skin depth of the metal or metal alloy at a given frequency.

FIG. 3E is a diagram illustrating a construction of an antenna module AM based on a single-sided module tape MT which may comprise a glass-epoxy tape substrate having copper cladding on a face-up side thereof for forming an antenna structure (AS), and also having a copper foil laminated to the face-up side thereof for forming contact pads (CP), such as for producing an antenna module AM having an antenna structure AS disposed on the face-up side of the module tape MT, beneath the contact pads CP of the antenna module AM. Some of the elements shown therein may include:
Contact side copper, 9 μm-35 μm
Adhesive, 20 μm
Cladding for antenna, 9 μm-35 μm (laser or chemically etched)
Glass epoxy module tape, 75 μm-100 μm FIG. 3E illustrates an antenna module 300E comprising a single-sided module tape MT 302 having a copper cladding layer CCL 310 on one side. The module tape (MT) may comprise epoxy-glass, and may have a thickness of approximately 75 μm. The copper cladding layer CCL may have a thickness of approximately 9-35 μm. The module tape MT in this embodiment (example) is oriented with the copper cladding layer CCL facing up (as viewed), and it will be used to form tracks of an antenna structure (AS), which may be one of two or more antenna structures. Structures and components on the face-down side of the module tape MT are omitted, for illustrative clarity, examples of such structures and components having been described in detail elsewhere in this specification, including antenna structures and the RFID chip.

The copper cladding layer CCL may be etched in any suitable manner, such as laser ablated, to create an antenna structure AS comprising a number of conductive tracks separated by spaces. (It is the spaces between tracks that are etched away from the copper layer material, leaving tracks). This may result in a planar (flat) spiral antenna structure AS having one long, continuous track making several turns, separated by spaces, and having two ends for connecting to the chip module (CM) and/or to another antenna structure (AS).

A copper foil layer CFL 330 having a thickness of 9 μm-35 μm, such as approximately 18 μm may patterned, to have contact pads CP of a contact pad array. The etched copper foil layer CFL may be laminated to the top (as viewed) surface of the antenna structure AS on the top of the module tape, such as with an adhesive 332 having a thickness of 20 μm.

Here we have an example of an antenna module AM having an antenna structure AS disposed on the face-up side of the module tape MT, beneath the contact pads CP of the antenna module AM. Additional structures such as bond pads and interconnect traces, may be formed on the face-down side of the module tape MT, and an RFID chip may be mounted thereto, as described elsewhere herein. One or more antenna structures may be disposed on the face-down side of the module tape MT, as described herein. These features and structures of the antenna module AM are omitted from this figure, for illustrative clarity. Reference is made to FIG. 2N, which also shows an etched antenna on the face-up side of a module tape MT.

FIGS. 3F and 3G are diagrams illustrating some configurations for an antenna structure AS disposed on the face-up side of the module tape MT, beneath the contact pads CP of the antenna module AM, such as has been discussed with respect to FIG. 3E.

FIG. 3F illustrates a laser or chemically etched module antenna layout that occupies the full available area of the module. Some of the elements shown therein may include:
Antenna loop
Antenna connection pads
Through hole positions FIG. 3G illustrates a laser or chemically etched module antenna layout that incorporates S-bends of varying pitch and size connected in series with the module antenna tracks in order to improve the performance of the module. Some of the elements shown therein may include:
Antenna loop, or coil
Antenna connection pads
S-bend extensions FIG. 3F shows a portion of an antenna module 300F having an antenna structure AS 320 which may be disposed on the face-up side of a module tape MT 302, such as was described with respect to FIG. 3E. The antenna structure AS may be made from one continuous spiral track, having two ends, and may have an antenna connection pad 326, 328 at each of the two ends thereof. Vias (indicated by "X") may be disposed under the antenna connection pads, extending through the module tape MT to the face-down side of the module tape MT for connection with the RFID chip.

It should be understood that, in any of the embodiments (examples) set forth herein, via connections may be made between connection pads (or contact pads) on the face-down side of the module tape MT to antenna connection pads ACP (or contact pads) on the face-up side of the module tape MT. Or, alternatively, suitably sized blind holes may be provided through the module tape MT so that wire-bond connections may be made from a component or element such as the RFID chip CM on the face-down side of module tape MT to the underside of an element (such as a contact pad or an antenna connection pad, or connection bridge) on the face-up side of the module tape MT (see, e.g., FIG. 2K).

In FIG. 3F, one of the antenna connection pads 328 may be disposed near the center of the module tape MT, and the other of the antenna connection pads 326 may be disposed near the periphery of the module tape MT. A number of (six) through-hole positions are shown (as dark black dots ●) for allowing connections to be made from a component or element such as the RFID chip CM on the face-down side of module tape MT to the underside of an element (such as a contact pad or an antenna connection pad) on the face-up side of the module tape MT.

The antenna connection pad 326 may be disposed near the periphery (edge) of the module tape MT so as to be aligned approximately over one of the antenna connection pads (LA or LB) on the RFID chip. This facilitates the use of a direct wire bond to the antenna structure AS without the need for a connection bridge CBR (see, e.g., FIG. 2K).

FIG. 3G shows a portion of an antenna module 300G having another configuration for an antenna structure AS 320 which may be disposed on the face-up side of a module tape MT 302, such as was described with respect to FIG. 3E. The antenna structure AS may be made from one continuous track, having two ends, and may have an antenna connection pad 326 and 328 at each of the two ends thereof. Vias (not shown) may extend from the face-down side (not visible in this view) of the module tape MT to the connection pads for connecting to the antenna connection pads (LA, LB) of the RFID chip.

In this embodiment (example), the antenna structure AS comprises a first (central) portion which is substantially located in a central portion of the module tape MT, comprising approximately 12 turns of the track, leaving remaining (peripheral) space to the left and right of, and above and below the first portion. The remaining space may be used to create additional antenna structures that are electrically in series with the first portion of the antenna structure. These additional antenna structures may be S-bend extensions that can increase capacitance in the module antenna MA and thereby improve coupling to the booster antenna (BA) or allow direct coupling to external contactless (ISO 14443) card reader device without the use of a booster antenna. (Compare, for example, the capacitive stubs B,C shown in FIG. 2A.)

Some Additional Multiple Antenna Structure(s)

Some of the techniques described hereinabove may be used to fabricate alternative antenna modules (AM).

For example, in a manner similar to that described with respect to FIG. 3D, two chemically or laser etched antenna structures (AS1, AS2) (or antenna structures) may be disposed the one side, such as on the bonding (face-down) side of the module tape MT, and interconnected with one another such as by plated vias. A double-sided copper clad epoxy glass laminate (glass/epoxy module tape) may comprise the following (all dimensions and materials are exemplary and approximate):

A first antenna structure AS1 may be chemically or laser etched from a 9 μm-35 μm thick copper cladding on the bond (face-down) side. The area occupied by the chip IC may be etched away to leave an exposed area of glass/epoxy module tape MT for depositing adhesive and bonding the RFID chip. The antenna structure (AS1) may have suitably placed connection pads at its (two) ends.

Following etching of the first antenna structure AS1, a layer of adhesive may be deposited on the bonding (face-down) side of the tape, and a 35 μm second copper foil may be laminated to the module tape over the first etched antenna structure AS1 and etched to form a second antenna structure AS2.

Magnetic particles in the form of flakes, spheres or rods of sizes (either ferromagnetic or paramagnetic) in the range 10 nm-100 μm may be mixed into the adhesive or deposited on top of the adhesive in order to improve the communication performance of the module.

Plated via connections may then be made from the second antenna structure AS2 to the copper cladding on the front (contact, face-up) of the module tape MT, passing by the first antenna structure AS1.

Chemical etching may be used to define the structure of a second antenna structure AS2, connection pads on the bonding (face-down) side of the module tape MT and the features (contact pads, connection bridges) on the contact (face-up) side.

The second antenna structure AS2 may have a different number or turns and a substantially different track width and track spacing than the first antenna structure AS1. This may result in different capacitance and inductance characteristics for the two (first and second) antenna structures. Antenna structures may be referred to herein as "antenna coils".

Additionally, an external capacitor IC (compare FIG. 3A) may be connected in series or parallel with the antenna structures AS1, AS2 to improve the communication performance of the antenna module AM. When the antenna structures are connected in series or parallel, or in "reverse-phase" with one another (as disclosed, for example, for inner and outer windings of a booster antenna, in U.S. Pat. No. 8,474,726, or in U.S. Pat. No. 8,366,009), the overall performance of the resonant circuit can be adjusted (tailored) to improve the performance of communication with the booster antenna BA, or to communicate directly with the an external contactless reader.

Alternatively, the starting material for this process can be a single-sided copper clad glass/epoxy tape with 9 μm-35 μm thick copper cladding on one side. The laser or chemical etching of the first antenna coil (AS1) can be performed, and then copper foil can be deposited on both sides of the tape using adhesive. In this manner a first antenna coil becomes sandwiched between the outer copper cladding on the bonding (face-down) side and the glass/epoxy, electrically insulated from the copper cladding by the adhesive. The second antenna coil, connected in series or parallel with the first, may then be chemically etched along with the contact side of the module tape. The two antenna coil structures can be connected to each other with plated vias. Copper (or other conductive material) foil may be referred to herein as copper cladding.

An alternative method to produce a module antenna can be to begin with glass epoxy substrate, or alternatively polyethylene naphthalate (PEN) or polyimide tape, clad on both sides with a flash of copper approximately 1 μm in thickness. Holes for plated vias can be laser drilled through the tape. Features such as the module antenna structure AS, bond pads BP and/or contact pads CP can be etched from the copper on both sides of the tape without the laser penetrating through the substrate. Following laser etching, additional copper may be grown to give overall copper thickness of (for example) 10 μm or up to 17 μm. Alternatively, the module antenna structure AS and bond pads BP may be laser etched from a substrate clad with approximately 1 μm copper on one side and through holes laser drilled. Subsequently, a layer of copper may be adhesively attached to the face up side of the module tape and laser or chemically etched to form the contact pads CP. Subsequent plating with nickel and gold or palladium can complete the production of the tape in both of these methods. In both methods the laser etching of the module antenna structure AS, bond pads BP and/or contact pads CP may be carried before or after growth of additional copper.

Partially-Formed (Inchoate) Antenna Structures

FIG. 4 is a diagram illustrating a construction of an antenna module AM based on a laser etched module antenna MA (optionally including connection pads, and interconnect traces) which that has been partially etched in a conductive foil and which may be laminated to the face-down side of a single-sided module tape MT. Some of the elements shown therein may include:

Contact side copper, 9 μm-35 μm
Glass epoxy module tape, 75 μm-100 μm
Adhesive, 20 μm
Cladding for antenna, 9 μm-35 μm (partially etched by laser etching)

The antenna module (AM) 400 may comprise a standard pre-preg laminate module tape MT 402 having a thickness of approximately 75 μm-100 μm, with one side cladded with a copper cladding layer CCL 430 having a thickness of approximately 9 μm-35 μm, such as less than 18 μm, may form the base material for producing Super 35 mm epoxy glass tape. This copper cladding layer CCL, after subsequent chemical etching, may form the contact pad array (CPA) having 6 or 8 contact pads (CP). The final thickness of this copper layer may be less than the skin depth (~18 μm) of copper at frequencies of interest. Such pre-preg laminate may be supplied in a standard width of 150 mm, so as to accommodate 4 rows (8 module positions) of 35 mm tape.

A conductive foil layer (CFL) 410 may be etched, at least partially through its thickness, to have tracks separated by spaces of an antenna structure 420, and may have a large opening extending at least partially through its thickness to accommodate an RFID chip (CM) 408. The conductive foil layer CFL may be attached to the face-down side of the module tape MT with a suitable adhesive 412.

FIGS. 4A, 4B, 4D, 4E, 4F are diagrams (cross-sectional views) illustrating a technique for preparing and using an "inchoate" antenna structure (AS), such as may have been shown in FIG. 4. FIG. 4C is a diagram (plan view) of a portion of an antenna structure (AS).

Figure 4A:
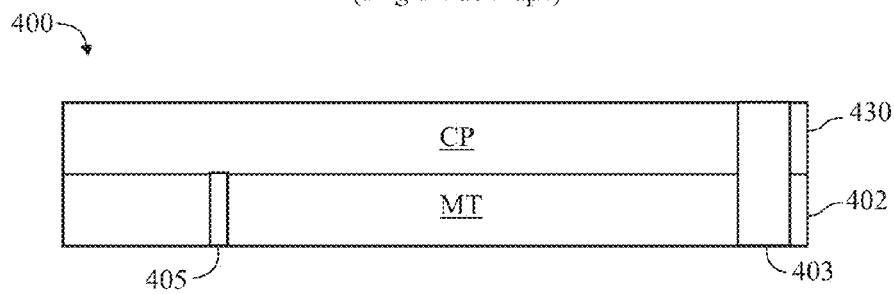

FIG. 4A illustrates a first step (create holes through the tape) of a process for fabricating an antenna module (AM) 400, such as shown in FIG. 4. A module tape MT 400 having an electrically-conductive cladding layer (CL) 430 (such as comprising copper) on its face-up side may be provided with (such as by punching) a first set of holes 403 which may be sprocket holes for transporting the module tape MT through automated production machinery. Indexing holes (not shown) may also be provided for tracking movement of the module tape MT. The module tape MT may comprise epoxy-glass. The cladding layer CL may be etched to have an array of contact pads (CP), and may have a thickness less than the skin depth for the material (such as copper) at a given frequency (such as 13.56 MHz).

A second set of holes 405 may also be provided (such as by punching) through the module tape MT to allow for vertical interconnects (or vias) to be made between one side of the module tape MT (such as the contact pads on the face-up side of the tape) to the other side of the module tape MT for connecting to a metalization (metallization) layer or layers (not shown) for an RFID chip CM and a module antenna MA which may be disposed on the other (face-down) side of the module tape MT. The sprocket holes and interconnect holes may be formed in any suitable manner using any suitable process, in any suitable order.

Figure 4B:
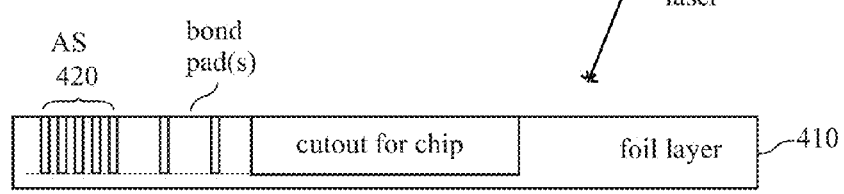
Figure 4C:
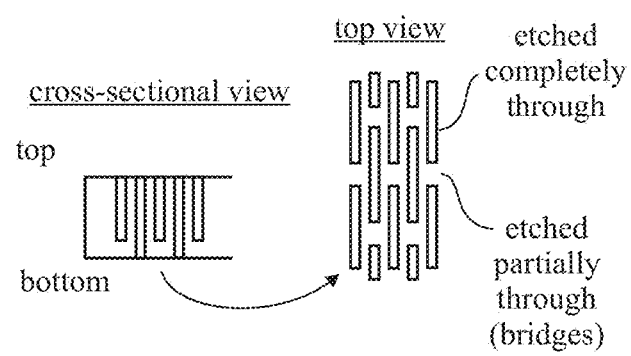

FIG. 4B illustrates a next step (laser ablation of foil), wherein a separate electrically-conductive foil layer 410 (such as comprising copper, with or without a release liner or adhesive backing, not shown) having a thickness of approximately 35 μm and a suitable width to accommodate a 35 mm, 70 mm or 150 mm epoxy glass tape, may be laser-ablated (or otherwise etched), removing material, to create a pattern of tracks (or traces) (or segments thereof) separated by spaces between the tracks for what will eventually be (or be a substantial portion of) an antenna structure (AS) 420, which may be the module antenna MA, disposed on the bottom (as viewed) side of the module tape MT. Bond pads may also be defined in this etch step. This etch may proceed from only one side (top, as viewed) of the copper foil layer CFL, or from both sides of the copper foil layer CFL, and may include a cutout (or void) for accommodating the RFID chip (CM).

The electrically-conductive foil layer 410 may be disposed, such as by lamination (such as heat and pressure), on the face-down (bottom, as viewed) side (which may also be referred to as the "bonding side" or "chip side", or variations thereof) of the module tape MT, and may incorporate antenna structure(s) (AS) or portions of antenna structure(s).

In addition to patterning the foil layer 410 for the antenna structure (AS) 420, the foil may additionally be patterned to form connection pads and interconnect traces for an RFID chip CM mounted to the face-down side of the module tape. The RFID chip CM may comprise a silicon die or chip, which may be back-lapped to a thickness of approximately 75 μm.

In this step, etching for the antenna tracks (and bond pads, and cutout for the RFID chip) may proceed only partially, but substantially, through the thickness of the copper foil from one or both sides thereof, such as by etching only 75%-90% through the copper foil. For example, for a 35 μm thick copper foil, the laser ablation may be controlled to proceed to a depth of only 30 μm (85% of the foil thickness). This may form what may be referred to as an "inchoate", or partially formed antenna structure AS. The antenna structure AS may be completed, or further formed in a subsequent step. Connection pads and interconnect traces on the face-down side of the module tape MT may also be formed (or similarly partially formed), in any suitable manner, from the copper foil layer CFL, along with the tracks (which may be referred to as "traces") of the antenna structure AS.

In this step, the copper foil layer CFL may be patterned or "preconditioned" to form at least a portion of traces for an antenna structure AS. In a subsequent step, the partially-completed (or "inchoate") antenna structure may be mounted to the module tape MT, and its structure completed to form (by way of example) the module antenna MA for an antenna module AM.

In this step, an opening (cut-out, window, cavity or recess) in the copper foil layer CFL may be formed (or similarly partially formed) to accommodate mounting an RFID chip CM to the face-down side of the module tape MT. This opening (cutout) in the copper foil for the RFID chip CM will allow for a reduction in the overall thickness of the resulting antenna module AM.

The tracks (and connection pads, and cutout for the RFID chip) may extend at least partially through the copper foil. Alternatively, they may extend completely through the copper foil. Portions of the traces (and connection pads and cutout) may extend only partially through the copper foil, other portions may extend completely through the copper foil. Selected ones of the traces, pads and cut-out may be etched from both sides of the copper foil. The tracks and connection pads and cutout need not all be etched from the same side of the copper foil, one or more of these etchings may be performed from an opposite side of the foil than other ones of these etchings. The tracks, connection pads and cutout and/or portions thereof, may be formed differently than one another, such as some may be punched and others ablated. It should be understood that the drawings presented herein may illustrate only portions of the traces, pads and cutout, and they are all illustrated as being etched (laser-ablated) from the same side of the copper foil.

A copper foil layer having at least "inchoate" (partially formed) tracks for an antenna structure may constitute an "interim product" which may be joined to a module tape MT and further processed to form a module antenna MA (and traces and connection pads).

For the purpose of handling and transport, prior to being mounted to the face-down side of the module tape MT, the depth of laser profiling in creating the tracks for the antenna structures AS, connection pads, interconnect traces, and an opening for the RFID chip can be approximately 90% of the overall thickness of the copper foil. The remaining copper, having a thickness less than 5 μm provides a substantially continuous, planar surface supporting the tracks of the inchoate antenna structure AS. The remaining copper (<5 μm) may be removed in subsequent production steps by chemical etching or through mechanical processing.

FIG. 4C illustrates (supporting the partially-formed tracks) that alternatively (or additionally), rather than forming all of the tracks (or traces) of the antenna structure AS by only partially cutting through the copper foil layer CFL, along most of the length of the tracks the laser ablation may proceed entirely through the copper foil layer CFL. (The left of the figure is a cross-sectional view, the right of the figure is a top view looking down on the copper foil layer CFL.) In other areas along the length of the tracks, the copper foil layer CFL may be left unablated, or may be partially ablated, in either case leaving supports or struts or bridges (non-ablated zones) connecting tracks of the antenna structure AS with one another. These support structures can be removed in subsequent production steps by chemical etching or through mechanical processing. In other words, laser ablation may proceeds entirely through the copper foil layer CFL, cutting entirely through the copper foil around most of the length of the tracks, and cutting only partially (or not at all) through the copper foil layer CFL in other places, leaving bridges of foil material extending between adjacent tracks.

In either of (i) laser etching only partially through the copper foil layer CFL along substantially the entirety of the pattern of the tracks (or traces) of the antenna structure AS or (ii) laser etching completely through the copper foil layer CFL in portions thereof, and leaving bridges connecting adjacent tracks (or traces) of the antenna structure AS, the antenna structure AS is "partially-formed" and may be referred to as an "inchoate" antenna structure AS.

Figure 4D:
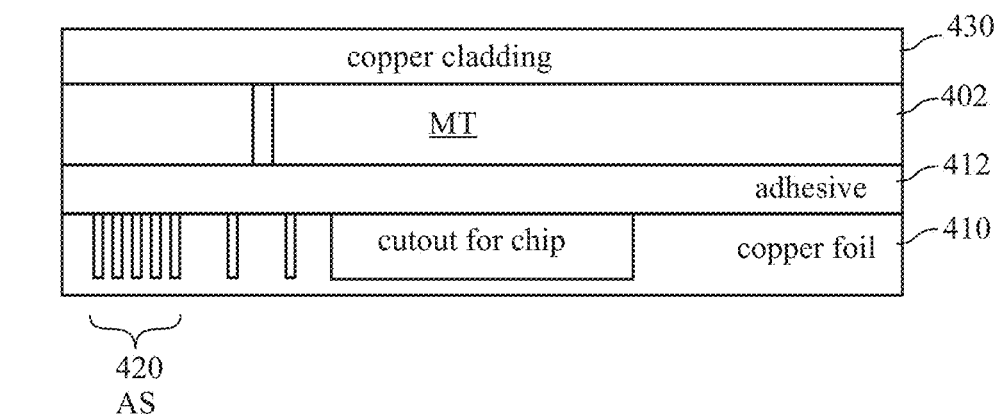

FIG. 4D illustrates a next step (joining partially-etched foil to module tape), wherein an adhesive layer 412 having a thickness of approximately 20 µm may be provided to join the copper foil layer 410 to the face-down side of the module tape MT 402. The adhesive may be applied to the (patterned) copper foil layer, to the module tape MT, or to both. The resulting stack (copper foil, adhesive, module tape) may be laminated under temperature and pressure. A baking or burn-in (degassing) process may be employed to remove any humidity or to improve the adhesion. The structures of the laser-profiled copper foil may be laminated to the module tape MT with its ablated surface (top, as viewed) disposed against the bottom (as viewed) of the module tape MT, leaving the un-ablated area (supporting the ablated structures) exposed, such as for subsequent chemical etching. This is illustrative of laser etching a foil to have tracks, in the pattern of a module antenna (MA), and then attaching the foil to a module tape (MT) such as FR4. If the module antenna (MA, or antenna structure AS) has only been partially etched, then a subsequent etch step may be required.

Figure 4E:
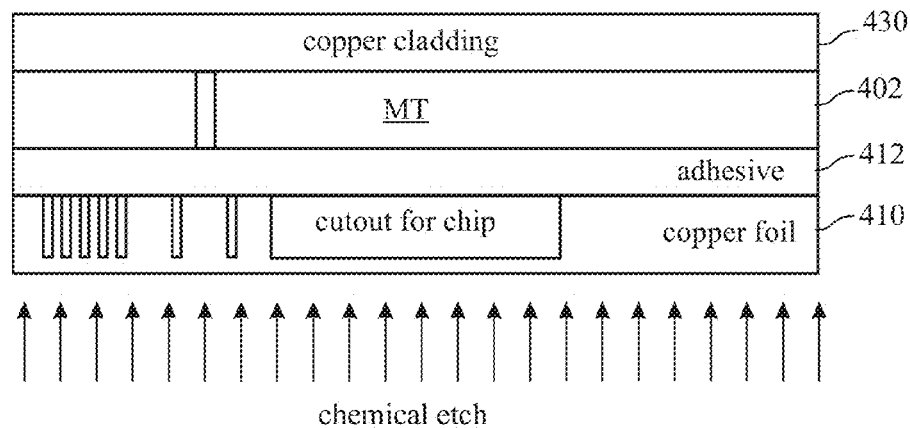
Figure 4F:
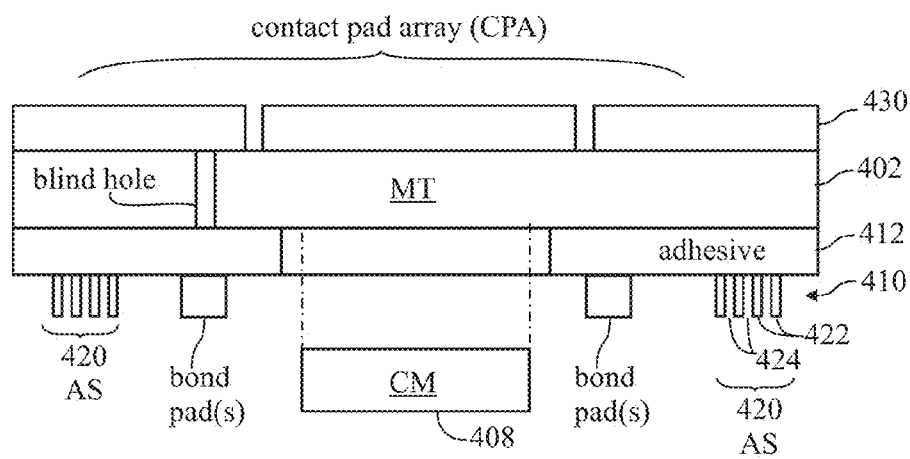

FIGS. 4E and 4F illustrate a next step (etch to complete tracks), wherein the un-ablated area of the copper foil layer 410 may be chemically etched to reveal (complete) the underlying laser ablated structures, such as the tracks 422 (separated by spaces 424) of the antenna structure AS 420. (In this step, the copper cladding layer 430 on the face-up side of the module tape MT may be also be chemically etched to have an array of contact pads CP. Alternatively, the copper cladding layer may be laser-etched to form the contact pads.) In FIGS. 4D,E,F, a bond pad is shown under a blind hole, for ease of illustration, but in reality the bond pad may not be directly under the blind hole which allows for wire bonding through the module tape MT. In FIG. 4F, the antenna structure AS 420 is shown on both the left and right sides (as viewed) of the module tape MT. In some other figures (such as FIGS. 4B, 4D, 4E), the antenna structure AS 420 may be shown on only one of the left or right sides of the module tape MT, for illustrative clarity.

In a next step (not shown), after lamination, the copper clad module tape MT with the laser etched copper foil layer 410 may be cleaned by sand blasting to remove any residual material. Thereafter, the copper layers 410 (AS) and 430 (CP) may be chemically etched to remove approximately 2-5 µm, removing oxidation and preparing the copper for nickel and gold plating. Following this step, standard processes may be used to produce the finished module tape MT and antenna module AM, such as mounting the RFID chip, etc., as discussed herein.

Chemical Etching to Improve Laser Etch Performance

Chemical etching may also be used to "improve" the performance of the laser ablation process. During laser ablation of a copper cladding to create the module antenna (antenna structure(s)), and other structures (such as connection pads, interconnect traces, etc.), ablated material may fall back down onto the ablated portion of the surface (e.g., spaces between traces) causing short circuits. In addition, there may some damage to the edges and surfaces of the copper track(s) due to oxidation during the laser ablation process. (Otherwise, the laser etching may proceed without significantly reducing the overall initial thickness of the copper cladding.) A mild chemical etch can be used to remove a small quantity of material from all exposed sides of the ablated copper structure. For instance, approximately 2 µm thickness may be removed by such a process. This would have the effect of widening the separation between ablated features, such as the spaces between adjacent antenna tracks, but this (widening) can be compensated in subsequent electroplating steps which can deposit a substantially equal (such as 2 µm) thickness of passivation metal(s) and restore the original feature (spaces) size.

Incorporating Light-Emitting Diodes (LEDs) into the Smartcard

US 20120138691 (Oberthur) discloses a smart card comprises a module having a microcircuit and a body including a cavity for receiving the module, wherein the cavity defines at least one surface area for fastening the module in the cavity, the body being formed by a stack of at least first and second layers respectively presenting weak adhesion and strong adhesion with the module. The area extends in the weak adhesion layer and includes at least one hole leading to the strong adhesion layer so as to form an anchor point for the module directly with said layer. As disclosed therein:

> At present there is a constant need to provide cards with new functions. It is thus known to add components to the card in addition to the antenna and the microcircuit module.
>
> For example, it is known to add a light-emitting diode (LED) that is electrically connected to the antenna and that is suitable for lighting up to indicate that contactless communication is taking place properly.

U.S. Pat. No. 8,033,457 (American Express) describes a card which includes an electronic component 26 of the surface-mounted type (SMC for "surface-mounted component"). The electronic component 26 is an LED. By way of example, the LED 26 is powered via the antenna 24 that is incorporated in the thickness of the body 12. Thus, the diode 26 forms an indicator lamp suitable for lighting up when near field communication takes place. By way of example, this may serve to inform the user of the card that communication is taking place properly, or on the contrary that it has failed. By way of example, and as shown in FIG. 1, the LED 26 is incorporated in decoration printed on the card 10, for example in the center of a pattern representing the sun.

According to an aspect of this disclosure, an electronic device may be connected to the wire ends of the booster antenna BA to harvest energy or to drive an LED to indicate the event of a contactless transaction. The wire ends of the booster antenna can also be connected to a switch in order to enable or disenable a contactless transaction. The electronic device may also be a component such as a resistor, capacitor, inductor, transistor or cell.

According to an aspect of this disclosure, an LED may be connected to the booster antenna BA of a smart card SC.

FIG. 5 is a diagram illustrating a booster antenna with its wire ends connected to an LED or any illuminating device without any physical connection to the chip module.

FIG. 5A is a diagram illustrating an LED connected in series with a rectifier diode. The rectifier may provide protection for the LED.

FIG. 5B is a diagram illustrating an LED connected in series with a rectifier diode and in parallel with a zener diode. The rectifier may provide protection for the LED. The zener diode may limit voltage across the LED. The lighting of the LED may be independent of the distance between the transponder and the reader.

According to an aspect of this disclosure, an LED may be incorporated (integrated) into the antenna module AM.

FIG. 5C is a diagram illustrating an LED in an antenna module (AM).
  window in module tape MT for LED. light emitting side (lens) module tape MT, contact side FIG. 5D is a diagram illustrating an LED in an antenna module (AM).

LED
RFID chip
antenna connection pads (ACP)
module tape MT, contact side
winding flange (or core) WC Comment 1: LED and chip can be attached and gold wire electrically bonded onto the chip carrier tape during the same assembly step Comment 2: in the LED Package are one LED serially connected with a rectifier diode protecting the LED against over current.

An LED may be incorporated (disposed) on the bonding (face-down) side of an antenna module AM by connection to a wire wound, laser etched or chemically etched antenna. This antenna may be a single module antenna MA which is also connected to the chip CM. Alternatively, the LED may be connected to a wire wound, laser etched or chemically etched antenna that is independent of the module antenna described previously, and this antenna may be referred to as the LED antenna (LEDA). In this embodiment, the LED may be powered independently of the chip and may activate when placed within a certain range of an external RF (contactless) reader. The activation range and brightness of the LED can be tuned by adjusting the number or turns, spacing between tracks and loop area of the LED Antenna. The LED can be used as a security device to indicate fishing attacks on a smartcard or to indicate that the smartcard is within the correct range of an RF reader when carrying out a contactless trans action.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), and claims, based on the disclosure(s) set forth herein.

What is claimed is:

1. A method of forming an antenna structure (AS) for an RFID antenna module (AM), comprising:
    performing a first etch to etch at least partially through a conductive foil to exhibit tracks separated by spaces, the spaces being the etched portions of the foil, the tracks being the un-etched portions of the foil; and
    mounting the foil to a module tape (MT);
    wherein the first etch comprises laser ablation.

2. The method of claim 1, wherein the first etch extends at least 70% and no more than 95% through the foil.

3. The method of claim 1, further comprising:
    performing a second etch to complete forming the tracks.

4. The method of claim 3, wherein
    the first etch comprises laser ablation; and
    the second etch comprises chemical etching.

5. A method of forming an antenna structure (AS) for an RFID antenna module (AM) comprising:
    laser etching a copper layer (CL) to form a laser-ablated structure; and
    chemical etching the laser-ablated structure,
    wherein:
    the copper layer has an initial thickness;
    the laser etching defines a plurality of tracks, separated by spaces, the spaces extending at least partially through the copper cladding; and
    the chemical etching removes less than one-tenth of the initial thickness of the copper layer, slightly increasing the size of the spaces between the tracks.

6. The method of claim 5, wherein:
    the tracks form at least a portion of an antenna structure (AS) for the RFID antenna module.

7. The method of claim 5, wherein:
    the laser etching proceeds without significantly reducing the overall initial thickness of the copper layer.

8. The method of claim 5, wherein:
    the copper layer comprises a conductive foil;
    the laser etch extends at least partially through the foil to partially form tracks separated by spaces, the spaces being the etched portions of the layer, the tracks being the un-etched portions of the foil; and
    mounting the foil to a module tape (MT).

9. The method of claim 8, wherein the laser etch extends at least 70% and no more than 95% through the foil, to partially form the tracks.

10. The method of claim 8, further comprising:
    the chemical etching completes forming the tracks.

11. The method of claim 8, wherein the conductive foil is laser etched only partially through its thickness; and
    a remaining, unetched thickness of the conductive foil supports at least some of the adjacent tracks of the antenna structure (AS).

12. A method of forming an antenna structure (AS) for an RFID antenna module (AM) comprising:
    laser etching a copper layer (CL) to form a laser-ablated structure; and
    chemical etching the laser-ablated structure,
    wherein:
    the laser etching defines a plurality of tracks, separated by spaces; and
    the chemical etching decreases the thickness of the copper layer and increases the size of the spaces between the tracks;
    further comprising:
    electroplating the chemically-etched laser-ablated structure, to increase the thickness of the copper layer and to reduce the size of the spaces between tracks.

13. The method of claim 12, wherein:
    the tracks form at least a portion of an antenna structure (AS) for the RFID antenna module.

14. The method of claim 12, wherein:
    the laser etching proceeds without significantly reducing the overall initial thickness of the copper layer.

15. The method of claim 12, wherein:
    the copper layer comprises a conductive foil;
    the laser etch extends at least partially through the foil to partially form tracks separated by spaces, the spaces being the etched portions of the layer, the tracks being the un-etched portions of the foil; and
    mounting the foil to a module tape (MT).

16. The method of claim 15, wherein the laser etch extends at least 70% and no more than 95% through the foil, to partially form the tracks.

17. The method of claim 15, further comprising:
    the chemical etching completes forming the tracks.

18. The method of claim 15, wherein the conductive foil is laser etched only partially through its thickness; and
    a remaining, unetched thickness of the conductive foil supports at least some of the adjacent tracks of the antenna structure (AS).

* * * * *